United States Patent
Kunishige et al.

(10) Patent No.: US 10,972,660 B2
(45) Date of Patent: Apr. 6, 2021

(54) IMAGING DEVICE AND IMAGING METHOD

(71) Applicant: Olympus Corporation, Hachioji (JP)

(72) Inventors: Keiji Kunishige, Hachioji (JP); Masashi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 131 days.

(21) Appl. No.: 16/273,090

(22) Filed: Feb. 11, 2019

(65) Prior Publication Data

US 2019/0260928 A1 Aug. 22, 2019

(30) Foreign Application Priority Data

Feb. 20, 2018 (JP) .............................. JP2018-028289

(51) Int. Cl.

| H04N 5/232 | (2006.01) |
|---|---|
| G02B 13/06 | (2006.01) |
| H04N 5/225 | (2006.01) |
| G06T 5/00 | (2006.01) |
| G02B 7/28 | (2021.01) |
| G06T 3/00 | (2006.01) |
| G02B 7/36 | (2021.01) |

(52) U.S. Cl.

CPC ......... H04N 5/23238 (2013.01); G02B 7/282 (2013.01); G02B 7/36 (2013.01); G02B 13/06 (2013.01); G06T 3/0018 (2013.01); G06T 5/006 (2013.01); H04N 5/2254 (2013.01)

(58) Field of Classification Search

CPC ............. H04N 5/23238; H04N 5/2254; H04N 5/3572; H04N 5/232127; G02B 7/36; G02B 13/06; G02B 7/282; G06T 5/006; G06T 3/0018

See application file for complete search history.

(56) References Cited

U.S. PATENT DOCUMENTS

| 7,561,786 | B1 * | 7/2009 | Black | G03B 17/56 |
| | | | | 396/57 |
| 8,340,453 | B1 * | 12/2012 | Chen | H04N 5/2353 |
| | | | | 382/254 |
| 8,368,773 | B1 * | 2/2013 | Jin | H04N 5/232 |
| | | | | 348/222.1 |
| 8,842,190 | B2 * | 9/2014 | Chen | H04N 5/23238 |
| | | | | 348/222.1 |

(Continued)

FOREIGN PATENT DOCUMENTS

| JP | 2008-061260 | 3/2008 |
| JP | 2011-097131 | 5/2011 |

*Primary Examiner* — James M Pontius
(74) *Attorney, Agent, or Firm* — John C. Pokotylo; Pokotylo Patent Services

(57) ABSTRACT

An imaging device that is capable of having a fisheye lens attached to a main body, and that is capable of shooting digital images, comprising, an image sensor on which photometric domains and/or AF region are arranged, a lens communication circuit that performs communication with a lens that has been attached and acquires lens information, and a processor that detects whether or not a lens that has been attached is a circular fisheye lens based on the lens information, and, if it has been determined that the lens is a circular fisheye lens, restricts the photometric domains and/or AF regions based on an image circle of the circular fisheye lens.

14 Claims, 30 Drawing Sheets

(56) References Cited

U.S. PATENT DOCUMENTS

| | | | |
|---|---|---|---|
| 2004/0095470 A1* | 5/2004 | Tecu | H04N 5/3572 |
| | | | 348/207.99 |
| 2012/0013997 A1* | 1/2012 | Yamanaka | G02B 7/10 |
| | | | 359/701 |
| 2012/0194685 A1* | 8/2012 | Kawakami | H04N 5/3572 |
| | | | 348/208.1 |
| 2013/0124471 A1* | 5/2013 | Chen | H04N 5/247 |
| | | | 707/624 |
| 2016/0373734 A1* | 12/2016 | Cole | H04N 17/002 |
| 2018/0157152 A1* | 6/2018 | Ajito | H04N 5/3572 |
| 2018/0234617 A1* | 8/2018 | Przyborski | G03B 13/36 |
| 2019/0356899 A1* | 11/2019 | Oh | H04N 5/23238 |
| 2019/0379877 A1* | 12/2019 | Oh | G06T 3/0018 |

* cited by examiner

FIG. 2A
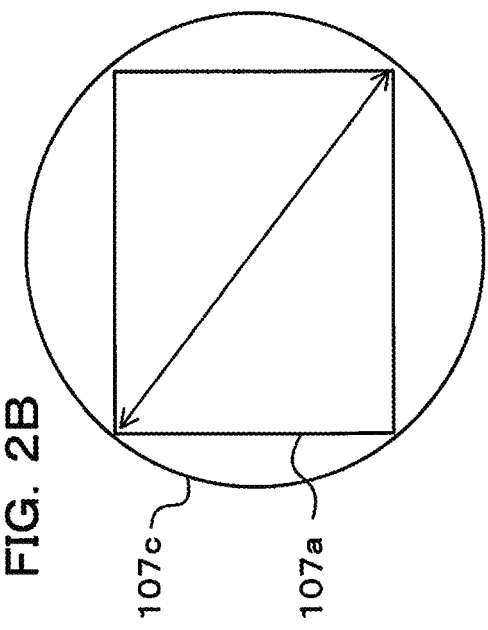
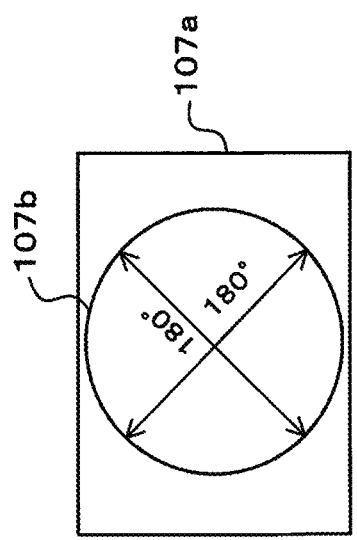
FIG. 2B
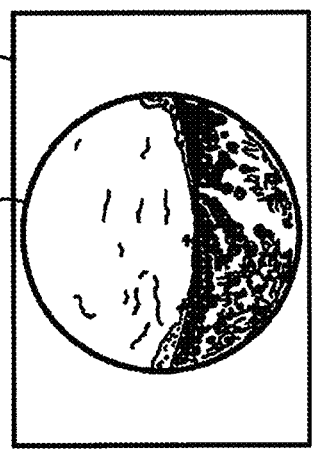

FIG. 4

FISHEYE FLAG TABLE

| | STATE | | | |
|---|---|---|---|---|
| FISHEYE LENS FLAG | 0 (NON-FISHEYE) | 1 (CIRCULAR FISH-EYE) | 2 (FULL-FRAME FISHEYE) | |
| FISHEYE/WIDE-ANGLE CONVERSION Flag | 0 (INVALID) | 1 (VALID) | | |
| WIDE ANGLE ANGLE OF VIEW Flag | 1 (ANGLE OF VIEW 1) | 2 (ANGLE OF VIEW 2) | 3 (ANGLE OF VIEW 3) | |
| UNDERWATER DISTORTION CORRECTION Flag | 0 (DO NOT PERFORM) | 1 (PERFORM) | | |
| ASPECT COMPATIBILITY TRIMMING Flag | 0 (DO NOT PERFORM) | 1 (PERFORM) | | |
| CIRCULAR FISH-EYE/FULL-FRAME FISHEYE CONVERSION Flag | 0 (INVALID) | 1 (VALID) | | |
| CIRCULAR FISH-EYE PROJECTION METHOD CONVERSION Flag | 0 (INVALID) | 1 (VALID) | | |
| PROJECTION METHOD Flag | 1 (ORTHOGONAL PROJECTION) | 2 (EQUIDISTANT PROJECTION) | 3 (EQUISOLID ANGLE PROJECTION) | 4 (SOLID ANGLE PROJECTION) |

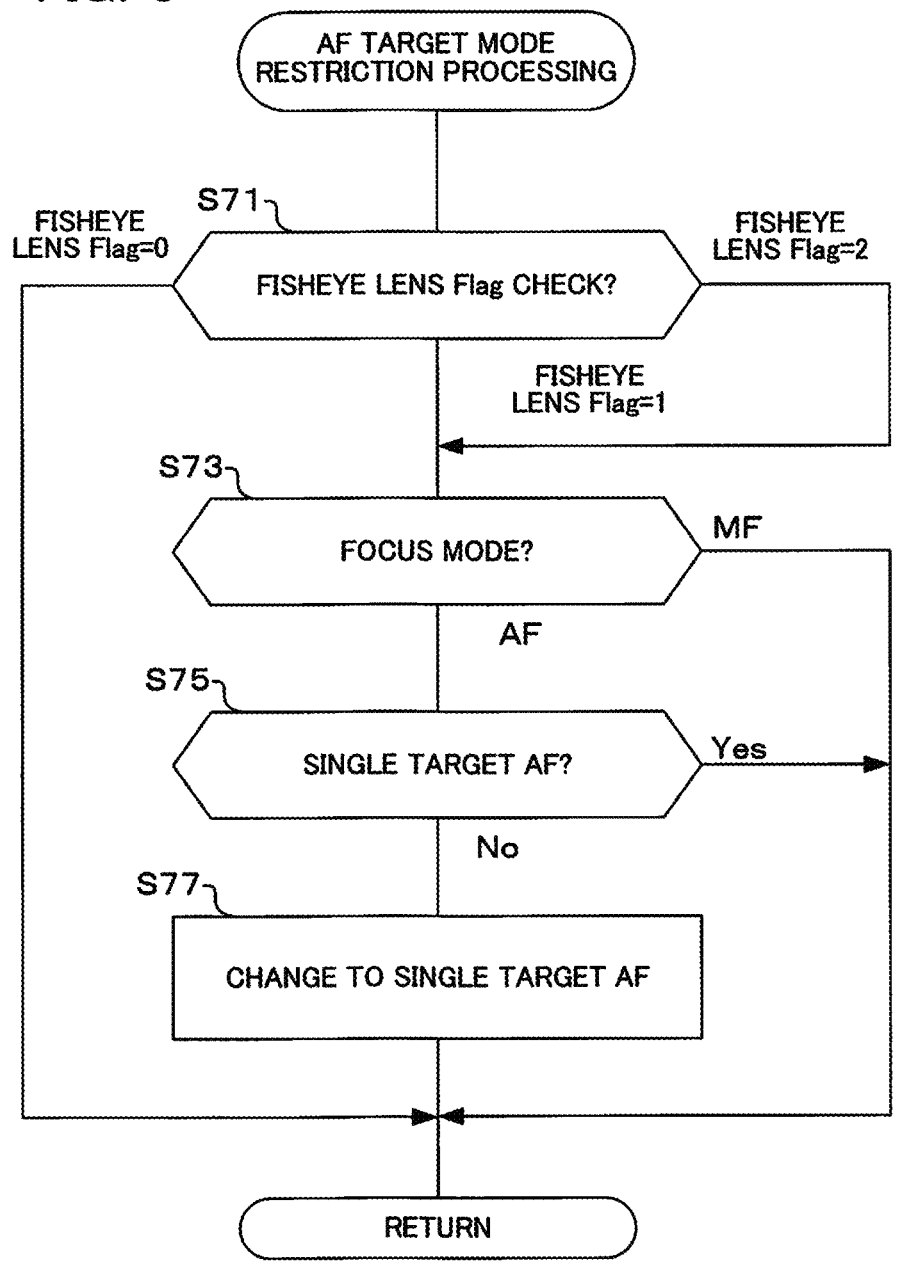

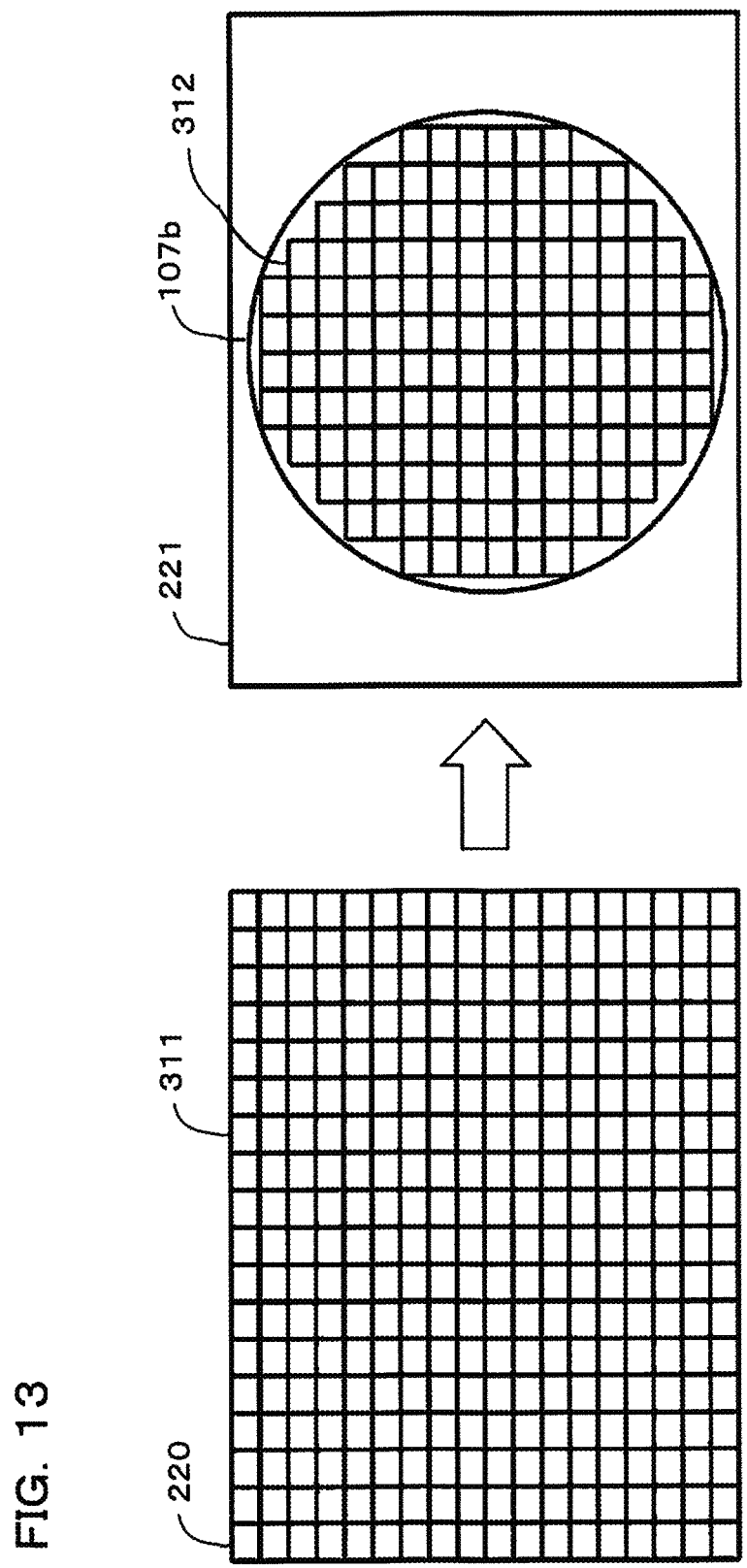

FIG14A

| TYPE OF LENS THAT HAS BEEN ATTACHED | PROJECTION METHOD Flag (PROJECTION METHOD TO BE CONVERTED TO) | IMAGE MAGNIFICATION CENTER PORTION FOR SCREEN CENTER PORTION ±10° | PHOTOMETRIC DOMAIN EXTENSION MAGNIFICATION |
|---|---|---|---|
| CIRCULAR FISH-EYE (ORTHOGONAL PROJECTION) | 1 (ORTHOGONAL PROJECTION) | 1.00 TIMES | 1.00 TIMES |
| | 2 (EQUIDISTANT PROJECTION) | 0.64 TIMES | 1.56 TIMES |
| | 3 (EQUISOLID ANGLE) | 0.50 TIMES | 1.98 TIMES |
| | 4 (SOLID ANGLE PROJECTION) | 0.71 TIMES | 1.41 TIMES |
| CIRCULAR FISH-EYE (EQUIDISTANT PROJECTION) | 1 (ORTHOGONAL PROJECTION) | 1.56 TIMES | 0.64 TIMES |
| | 2 (EQUIDISTANT PROJECTION) | 1.00 TIMES | 1.00 TIMES |
| | 3 (EQUISOLID ANGLE) | 0.79 TIMES | 1.27 TIMES |
| | 4 (SOLID ANGLE PROJECTION) | 1.11 TIMES | 0.90 TIMES |
| CIRCULAR FISH-EYE (EQUISOLID ANGLE PROJECTION) | 1 (ORTHOGONAL PROJECTION) | 1.98 TIMES | 0.50 TIMES |
| | 2 (EQUIDISTANT PROJECTION) | 1.27 TIMES | 0.79 TIMES |
| | 3 (EQUISOLID ANGLE) | 1.00 TIMES | 1.00 TIMES |
| | 4 (SOLID ANGLE PROJECTION) | 1.41 TIMES | 0.71 TIMES |
| CIRCULAR FISH-EYE (SOLID ANGLE PROJECTION) | 1 (ORTHOGONAL PROJECTION) | 1.41 TIMES | 0.71 TIMES |
| | 2 (EQUIDISTANT PROJECTION) | 0.90 TIMES | 1.11 TIMES |
| | 3 (EQUISOLID ANGLE) | 0.71 TIMES | 1.41 TIMES |
| | 4 (SOLID ANGLE PROJECTION) | 1.00 TIMES | 1.00 TIMES |

FIG14B

| SPOT PHOTOMETRIC DOMAIN ON IMAGE SENSOR | CENTER WEIGHTED POINT PHOTOMETRIC DOMAIN ON IMAGE SENSOR |
|---|---|
| 8×8 | 20×20 |
| 13×13 | 31×31 |
| 11×11 | 40×40 |
| 5×5 | 28×28 |
| 5×5 | 13×13 |
| 8×8 | 20×20 |
| 10×10 | 25×25 |
| 7×7 | 18×18 |
| 4×4 | 10×10 |
| 6×6 | 16×16 |
| 8×8 | 20×20 |
| 6×6 | 14×14 |
| 6×6 | 14×14 |
| 9×9 | 22×22 |
| 11×11 | 28×28 |
| 8×8 | 20×20 |

FIG. 17B
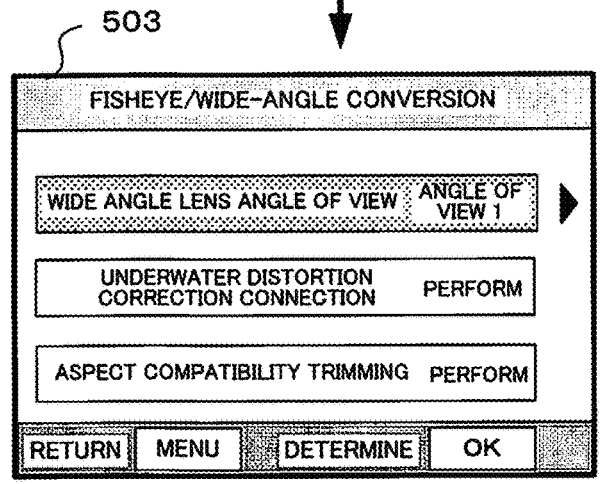
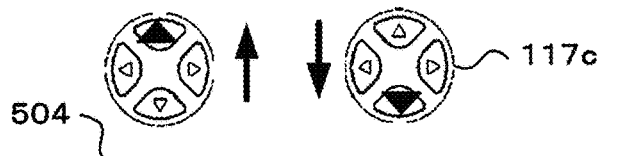
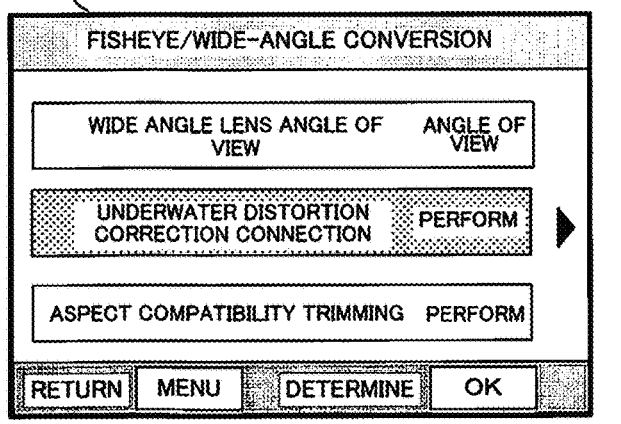
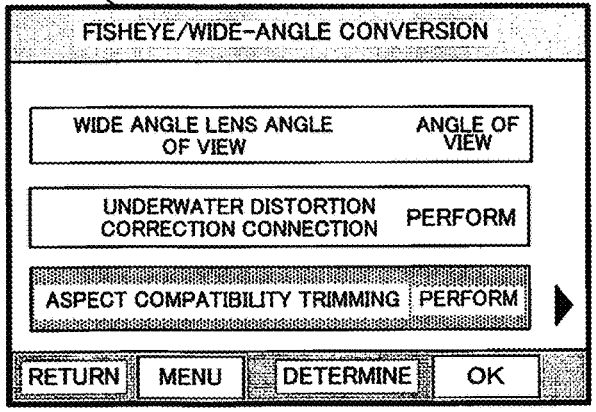

FIG. 19
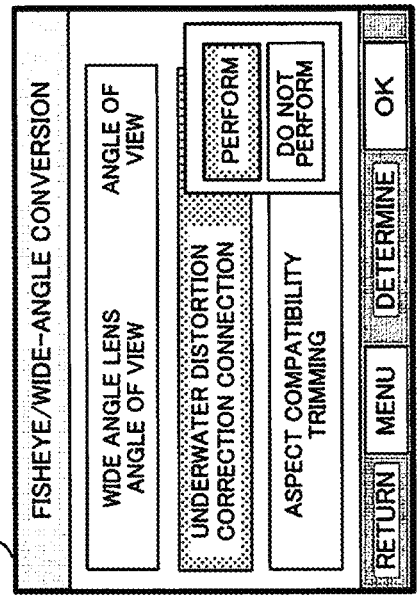
FIG. 20
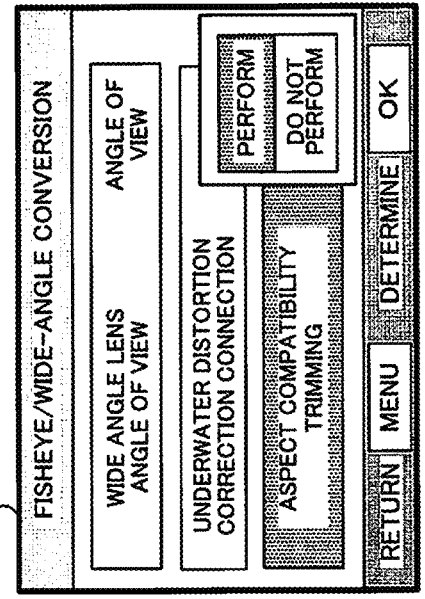
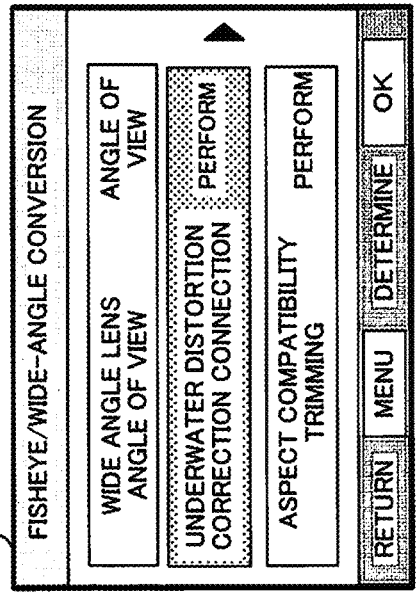
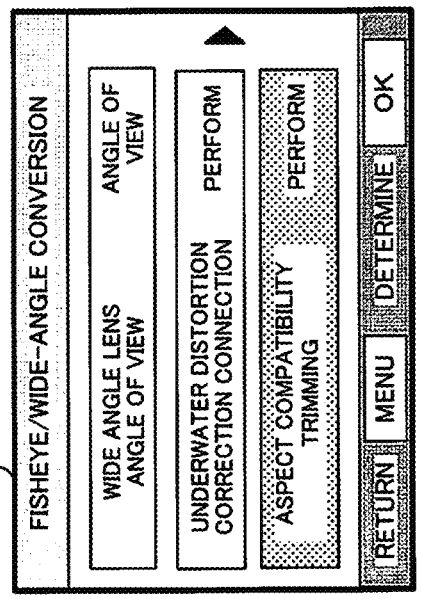

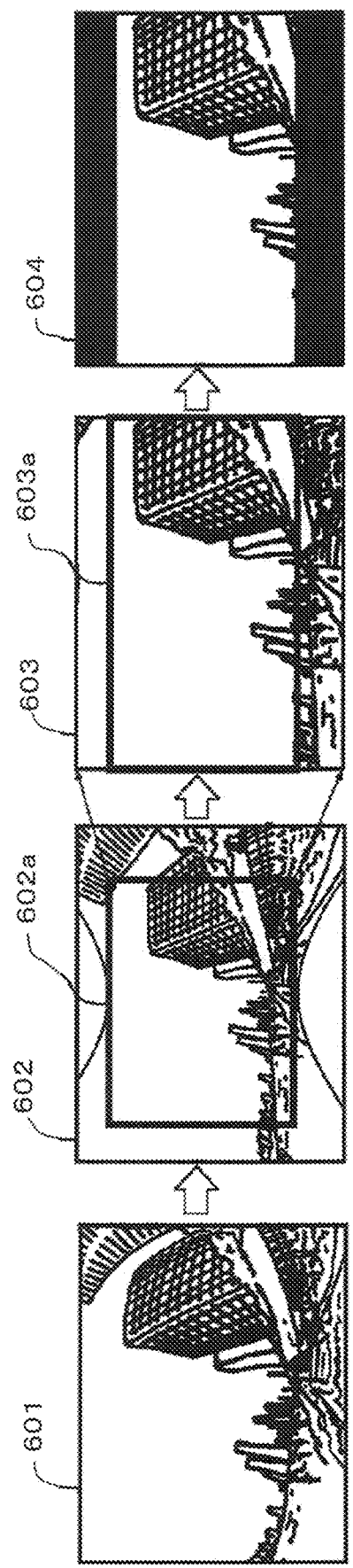
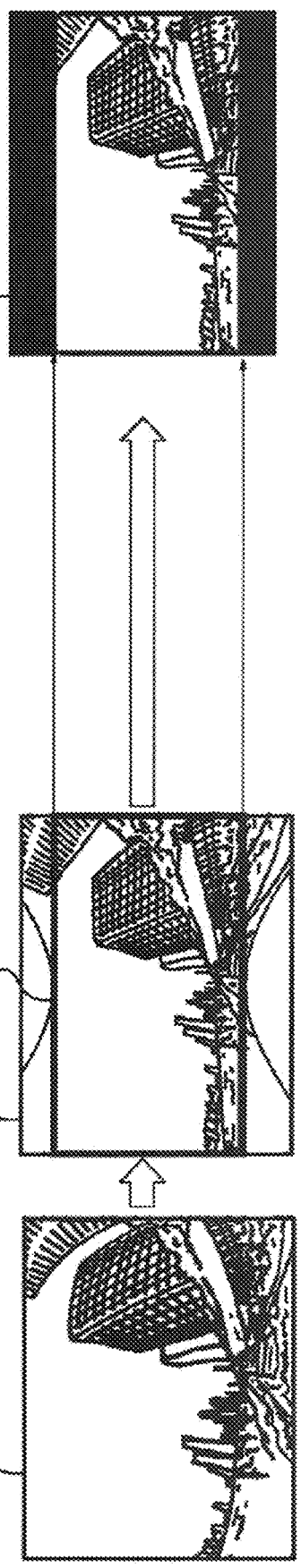
FIG. 21A
FIG. 21B

TO 512a in FIG. 22B

FIG. 25
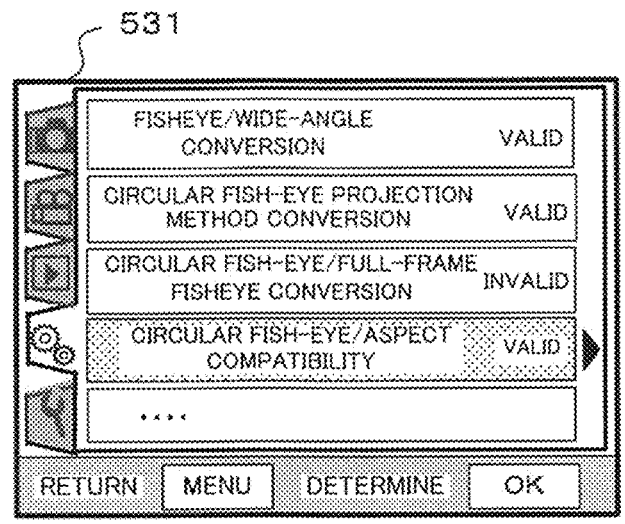
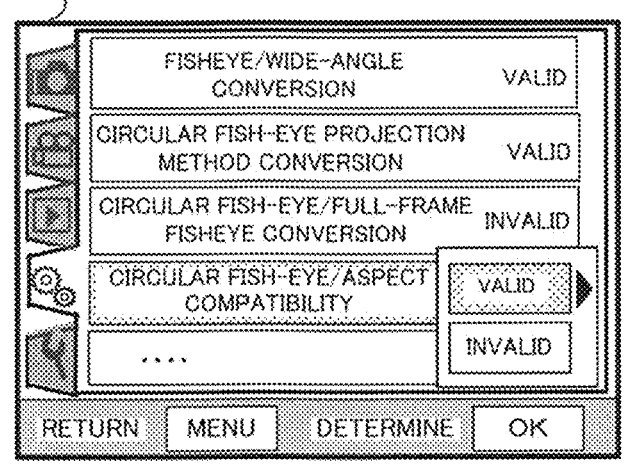
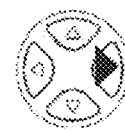
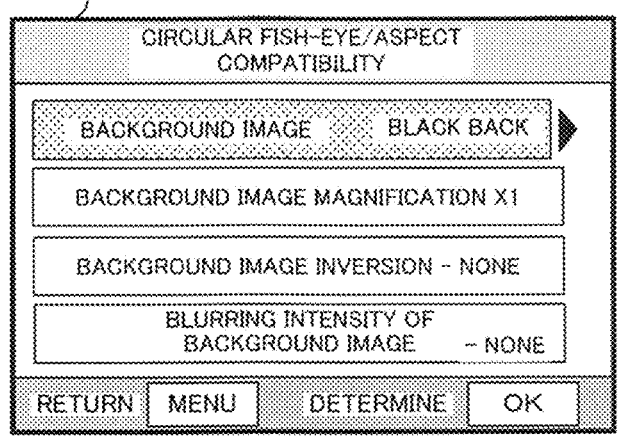

IMAGING DEVICE AND IMAGING METHOD

CROSS-REFERENCE TO RELATED APPLICATIONS

Benefit is claimed, under 35 U.S.C. § 119, to the filing date of prior Japanese Patent Application No. 2018-028289 filed on Feb. 20, 2018. This application is expressly incorporated herein by reference. The scope of the present invention is not limited to any requirements of the specific embodiments described in the application.

BACKGROUND OF THE INVENTION

1. Field of the Invention

The present invention relates to an imaging device and an imaging method that can appropriately set an AF ranging region and/or a photometric domain in an imaging device that can be fitted with a so-called fisheye lens. In more detail, the present invention relates to an imaging device and imaging method that can appropriately set AF ranging regions and/or photometric domains that have been arranged on a display screen and/or an imaging surface, of an imaging device that subjects an image that has been acquired by a fisheye lens to distortion conversion using digital image processing, and is capable of performing live view display of the image that has been converted.

2. Description of the Related Art

A fisheye lens that can shoot a subject in a wide range, such as 180°, is commercially available. A fisheye lens is a lens that adopts a projection method that is not a central projection method. Fisheye lenses are divided into two types, namely circular fisheye lenses (hereafter referred to as "circular fish-eye") and full-frame fisheye lenses (hereafter referred to as "full-frame fisheye"). Circular fish-eye means a lens that has an image circle contained in a screen (refer, for example, to FIG. 2A). Also, full-frame fisheye means a lens that has an image circle diameter that is the same as or slightly larger than a diagonal line of the screen (for example, to FIG. 2B).

With an image that has been taken using a fisheye lens, distortion arises in accordance with projection method of the fisheye lens. It has therefore been proposed to subject an image that has been taken using a fisheye lens to projection transformation with any of a plurality of projection methods, using digital image processing (refer, for example, to Japanese patent laid open number 2011-097131 (hereafter referred to as patent publication 1)).

A fisheye lens camera has also been proposed that performs distortion correction on an image that has been taken with a fisheye lens using image processing, and achieves the same effect as a wide angle lens by cropping this image (refer, for example, to Japanese patent No. 4268206 (hereafter referred to as patent publication 2)).

As was described previously, recently optical images that have been acquired using a fisheye lens are converted to image data, and various image conversions are performed using image processing. A focus detection apparatus has therefore been conventionally installed in an imaging device, in order to perform auto focus (AF) of a photographing lens. As a focus detection method there is, for example, a contrast AF method. This method extracts contrast information using image data that has been output from an image sensor, and adjusts position of the photographing lens so that this contrast information becomes a peak. As another method, there is an image plane phase difference AF method. With this method, phase difference detection pixels are arranged replacing some image signal output pixels, on the image plane of the image sensor. Focus shift amount for the photographing lens is then calculated based on output of the phase difference detection pixels, and focus position of the photographing lens is adjusted.

It is possible to perform auto focus of the photographing lens with the previously described contrast AF method and the image plane phase difference AF method using output of pixels that have been arranged on the imaging surface of the image sensor. With this type of automatic focus adjustment (AF) device, it is possible to extend a focus detection region (AF region) to the entire surface of the imaging surface. This makes it possible to significantly improve the ability to supplement a subject that constitutes a target of focusing. However, if a circular fisheye lens is attached as the photographing lens some AF regions and photometric domains become outside the image circle, and automatic exposure control (AE) and automatic focus adjustment (AF) become unstable.

This point will be described using FIG. 28A and FIG. 28B. FIG. 28A shows a relationship between an image 1000 on the image sensor, and AF regions. With this example, a camera performs focus detection using both a contrast AF method and an image plane phase difference AF method. Reference numeral 1001 represents one contrast AF unit (a specified number of image signal output pixels are included in one unit), and reference numeral 1002 represents one image plane phase difference AF unit (a specified number of phase difference detection pixels are included in one unit).

FIG. 28B shows an image circle 1010 in a case where a circular fisheye lens has been attached. Although the image sensor within the image circle 1010 outputs image signals, the image sensor outside the image circle 1010 does not form a subject image and so image signals are not output. Therefore, if an AF region outside the image circle 1010 has been selected manually by the photographer or automatically by the camera, it will not be possible to perform focus detection. Not only is it not possible to perform focus detection, the possibility of an alias signal being generated is high and the device is susceptible to distance error and ranging being not possible. Similarly, if a photometric domain (AE region) outside the image circle 1010 has been set manually by the photographer or automatically by the camera, it will not be possible to perform photometry that is meaningful for obtaining a subject image of correct brightness.

Also, with a fisheye lens stronger distortion arises closer to the edge of an image generated by the lens. This means that in a case where shooting is performed while holding the camera peripheral image distortion will also change together with vibration due to camera shake, and will become an intricately swinging image. This problem will not be resolved even if camera shake is averted using a camera shake correction function. Generally, camera shake correction is a mechanism for correcting angular fluctuation. Specifically, camera shake correction corrects angular fluctuation by causing a photographing lens or image sensor to move so as to maintain a center position of an image plane. However, even if the photographing lens or the image sensor is moved so as to maintain center position of the image plane, since change in distortion of a peripheral image is not cancelled, instead a more intricately swinging image will result.

As a result, if an AF region is set at the edge of the image, then in the case of contrast AF since contrast detection is performed using a plurality of frame images and takes time it will not be possible to accurately capture a peak of contrast and false focusing will arise. Also, in the case of image plane phase difference AF exposure is performed for phase difference detection pixels that does not require as much time as contrast AF, a certain amount of time is required when reading out pixel signals. Accurate focus detection is obstructed by the effect of image shake while shooting is taking place that requires the certain amount of time to read out pixels. As described above, in a case where a fisheye lens having strong distortion has been fitted to the camera body, for an image that is generated by the fisheye lens, particularly at peripheral parts of the image, both AF and photometry operations become extremely unstable due to change in image distortion due to camera shake during AF and photometry.

The above described problems are attributable to strong distortion as optical characteristics of the fisheye lens. However, in recent years, with digital cameras having a fisheye lens attached further improvements to convenience and functionality of a fisheye lens have emerged due to performing strong distortion conversion processing using image processing, as described in (1) to (3) below.

(1) It is possible to perform image conversion of an image that has been generated by the fisheye lens to an image that appears to have been generated by a wide angle lens by correcting strong distortion of the fisheye lens in the reverse direction (fisheye/wide-angle conversion processing).

(2) It is possible to utilize a single fisheye lens as a fisheye lens of various projection methods by changing a projection method using image processing on an image that has been generated by the fisheye lens (fish eye projection transformation processing).

(3) Size of an image circle of a circular fisheye lens is corrected in conjunction with aspect ratio of the camera (aspect ratio linked trimming processing).

In particular, with a mirrorless interchangeable lens camera a live view image is displayed based on image data that has been acquired by an image sensor. In the case of attaching a fisheye lens to a mirrorless interchangeable lens camera, various correction is performed on an image that has been generated by the fisheye lens, and it is possible to observe an image after this correction. This means that it is possible for the photographer to perform shooting after previously confirming an image after image conversion, which has a significant effect.

However, with a mirrorless interchangeable lens camera AF regions and ranging regions are set (mapped) within a wide range of the imaging surface of the image sensor. Positions of these AF regions and ranging regions become positions and region shapes that cause significant discomfort to the user on a viewfinder screen as a result of the previously described correction being performed by applying image processing. Conversely, if display is performed so as not to cause discomfort, position of a subject on the live view display differs from the actual position and region shape of the AF regions and photometric domains on the image sensor.

This point will be described using FIG. 29A and FIG. 29B. Photographs 1020 and 1040 on the left side of FIG. 29A and FIG. 29B are images resulting from having subjected images generated by a fisheye lens to distortion conversion. Here, image processing (fisheye/wide-angle conversion processing) to eliminate (or reduce) distortion is applied. An image before distortion conversion that has been generated by the fisheye lens is formed on the image sensor. If rectangles 1030 of the grid (lattice shape) shown on the right side of FIG. 29A are overlapped on the photograph 1020 to which distortion conversion has been applied by a fisheye lens, it results in rectangles (also including a lattice shape grid) that have been distorted by pin cushion distortion to the center of FIG. 29A. Also, if the rectangles 1050 of the grid (lattice shape) that is overlapped on the photograph 1040 shown on the left side of FIG. 29B are overlapped on an image that has been generated on the image sensor by a fisheye lens, it results in barrel distortion rectangles (also including the grid) 1050 as shown on the right side of FIG. 29B.

In this way, for an image that has been generated on the image sensor by the fisheye lens, and a live view image that has had the distortion eliminated (or reduced), corresponding pixel positions are significantly out of alignment. This means that position and region shape of the AF regions and/or photometric domains on the view finder screen, and the corresponding position and region shape on the image sensor, are significantly out of alignment. In the case of performing focus detection using contrast AF, it has been considered to acquire contrast value by recalculation from image data after distortion conversion, without obtaining contrast value from contrast detection pixels that have been arranged on the image sensor. However, too much processing time is required for the recalculation. This means that, as was described previously, it becomes easy to be affected by change in image distortion due to camera shake. In particular, in the case of performing focus detection using image plane phase difference AF, phase difference detection pixels are fixed at positions that have been mapped to the imaging surface of the image sensor, and so changing that position is difficult.

SUMMARY OF THE INVENTION

The present invention provides an imaging device and imaging method that perform optimum AF and/or AE even in a case where image processing for distortion conversion, including distortion correction, has been applied to an image that has been generated by a fisheye lens.

An imaging device of a first aspect of the present invention is capable of having a fisheye lens attached to a main body and is capable of shooting digital images, the imaging device comprising: an image sensor on which photometric domains and/or AF region are arranged; a lens communication circuit that performs communication with a lens that has been attached and acquires lens information; and a processor that detects whether or not a lens that has been attached is a circular fisheye lens based on the lens information, and, if it has been determined that the lens is a circular fisheye lens, restricts the photometric domains and/or AF regions based on an image circle of the circular fisheye lens.

An imaging device of a second aspect of the present invention is capable of having a fisheye lens attached to a main body and is capable of shooting digital images, the imaging device comprising: an image sensor on which photometric domains and/or AF region are arranged; a lens communication circuit that performs communication with a lens that has been attached and acquires lens information; a processor that detects whether or not a lens that has been attached is a fisheye lens based on the lens information; an image processing circuit that corrects an image within an imaging range of the fisheye lens; and a display that displays an image after correction by the image processing circuit as a live view image, wherein, when an image has been corrected by the image processing circuit, calculation is performed so that for the photometric domains and/or AF regions, position or area on the display substantially match position and area on the image sensor.

An imaging device of a third aspect of the present invention is capable of having a fisheye lens attached to a main body and is capable of shooting digital images, the imaging device comprising: an image sensor on which photometric domains and/or AF regions are arranged; a lens communication circuit that performs communication with a lens that has been attached and acquires lens information; a processor that detects whether or not a lens that has been attached is a fisheye lens based on the lens information; an image processing circuit that corrects an image of an imaging range of the fisheye lens; and a display that displays an image after correction by the image processing circuit as a live view image, wherein, the processor converts coordinates of the AF regions on the live view image to coordinates of AF regions on the image sensor.

An imaging method of a fourth aspect of the present invention is an imaging method for an imaging device that is capable of having a fisheye lens attached to a main body, has photometric domains and/or AF regions arranged on an image sensor, and is capable of shooting digital images, the imaging method comprising: performing communication with a lens that has been attached and acquiring lens information; detecting whether or not a lens that has been attached is a circular fisheye lens based on the lens information; and if it has been determined that the attached lens is a circular fisheye lens, restricting the photometric domains and/or AF regions based on an image circle of the circular fisheye lens.

An imaging method of a fifth aspect of the present invention is an imaging method for an imaging device that is capable of having a fisheye lens attached to a main body, has photometric domains and/or AF regions arranged on an image sensor, and is capable of shooting digital images, the imaging method comprising: performing communication with a lens that has been attached and acquiring lens information; correcting an image of imaging range of the fisheye lens; displaying an image after correction as a live view image; and when the image has been corrected, performing calculation so that for the photometric domains and/or AF regions, position or area on the display section substantially match position and area on the image sensor.

An imaging method of a sixth aspect of the present invention is an imaging method for an imaging device that is capable of having a fisheye lens attached to a main body, has photometric domains and/or AF regions arranged on an image sensor, and is capable of shooting digital images, the imaging method comprising: performing communication with a lens that has been attached and acquiring lens information; correcting an image of imaging range of the fisheye lens; displaying an image after correction as a live view image on a display section; and converting coordinates of the AF regions on the live view image to coordinates of AF regions on the image sensor.

BRIEF DESCRIPTION OF THE DRAWINGS

FIG. 2A and FIG. 2B are drawings for describing differences between a circular fisheye lens and a full-frame fisheye lens that are capable of being fitted to a camera of one embodiment of the present invention.

FIG. 4 is a table for describing flags that are used within the flowchart showing operation, in the camera of one embodiment of the present invention.

FIG. 9 is a flowchart showing operation of AF target mode restriction processing of the camera of one embodiment of the present invention.

FIG. 13 is a drawing for describing the fact that photometric domain is restricted within an image circle, in the case of a circular fish-eye, in the camera of one embodiment of the present invention.

FIG. 14A and FIG. 14B are tables showing calculation examples for expansion magnification of photometric domain due to projection transformation, in the camera of one embodiment of the present invention.

FIG. 17A and FIG. 17B are drawings showing examples of menu display in a case of performing fisheye correction (fisheye/wide-angle conversion), in the camera of one embodiment of the present invention.

FIG. 19 is a drawing showing examples of menu display in a case of performing fisheye correction (fisheye/wide-angle conversion), in the camera of one embodiment of the present invention.

FIG. 20 is a drawing showing examples of menu display in a case of performing fisheye correction (fisheye/wide-angle conversion), in the camera of one embodiment of the present invention.

FIG. 21A and FIG. 21B are drawings showing one example of image processing, in a case of performing fisheye/wide-angle conversion, in the camera of one embodiment of the present invention.

FIG. 25 is a drawing showing examples of menu display in a case of performing circular fish-eye/aspect compatibility, in the camera of one embodiment of the present invention.

DETAILED DESCRIPTION OF THE PREFERRED EMBODIMENTS

Preferred embodiments using an imaging device to which the present invention has been applied will be described in the following in accordance with the drawings. An imaging device of one preferred embodiment of the present invention is a digital camera (hereafter referred to as a "camera") that has an imaging section, and a subject image is converted to image data by this imaging section. A display section performs live view display based on image data that has been converted. A photographer determines composition and photo opportunity by looking at the live view display. If the photographer presses a release button down halfway, automatic focus adjustment of a photographing lens and automatic exposure control are performed. If the photographer presses the release button down fully, the imaging section acquires image data and the image data that has been acquired is stored in a storage medium.

Also, this imaging device is capable of having a fisheye lens attached to a main body, and is capable of shooting digital images. In a case where a fisheye lens that has been attached is a circular fisheye lens, AF regions and/or photometric domains are restricted within an image circle of the circular fisheye lens (refer to S67 in FIG. 7, and to FIG. 8, FIG. 12 and FIG. 13). Also, when a circular fisheye lens has been attached, if a mode for performing focus detection has been set for a plurality of AF ranging regions, it will be modified to restrict AF ranging region to a single region. Specifically, there is restriction to an optimum AF target mode (refer to S7 in FIG. 3, and to FIG. 9 and FIG. 10A to FIG. 10D).

Also, in a case where a fisheye lens that has been fitted to the camera has strong peripheral distortion, a degree of image change over time due to distortion accompanying camera shake becomes larger for parts of the image at the peripheral part of a screen. Therefore, if it is determined that a lens that has been attached is a fisheye lens, in an imaging time for AF and/or AE, AF regions and photometric domains are restricted to regions that are close to the center part of the screen, so that amount of image distortion fluctuation that arises due to distortion amount of the fisheye lens and camera shake amount does not have an adverse effect on stability of AF and/or AE. Also, there is restriction to optimum AF target mode and photometry mode.

Figure 3:
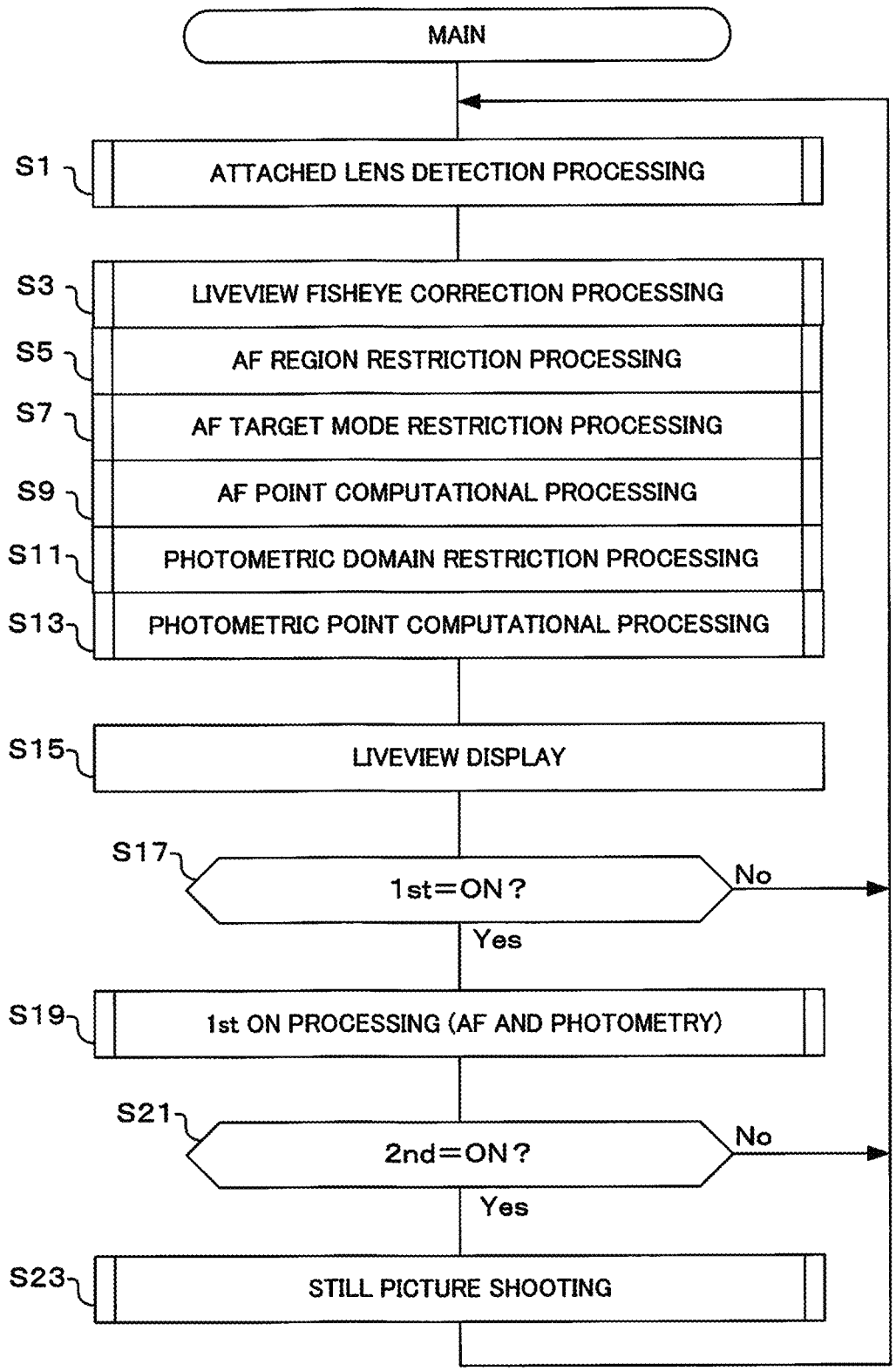
FIG. 3 is a flowchart showing main operation of the camera of one embodiment of the present invention.
Figure 6:
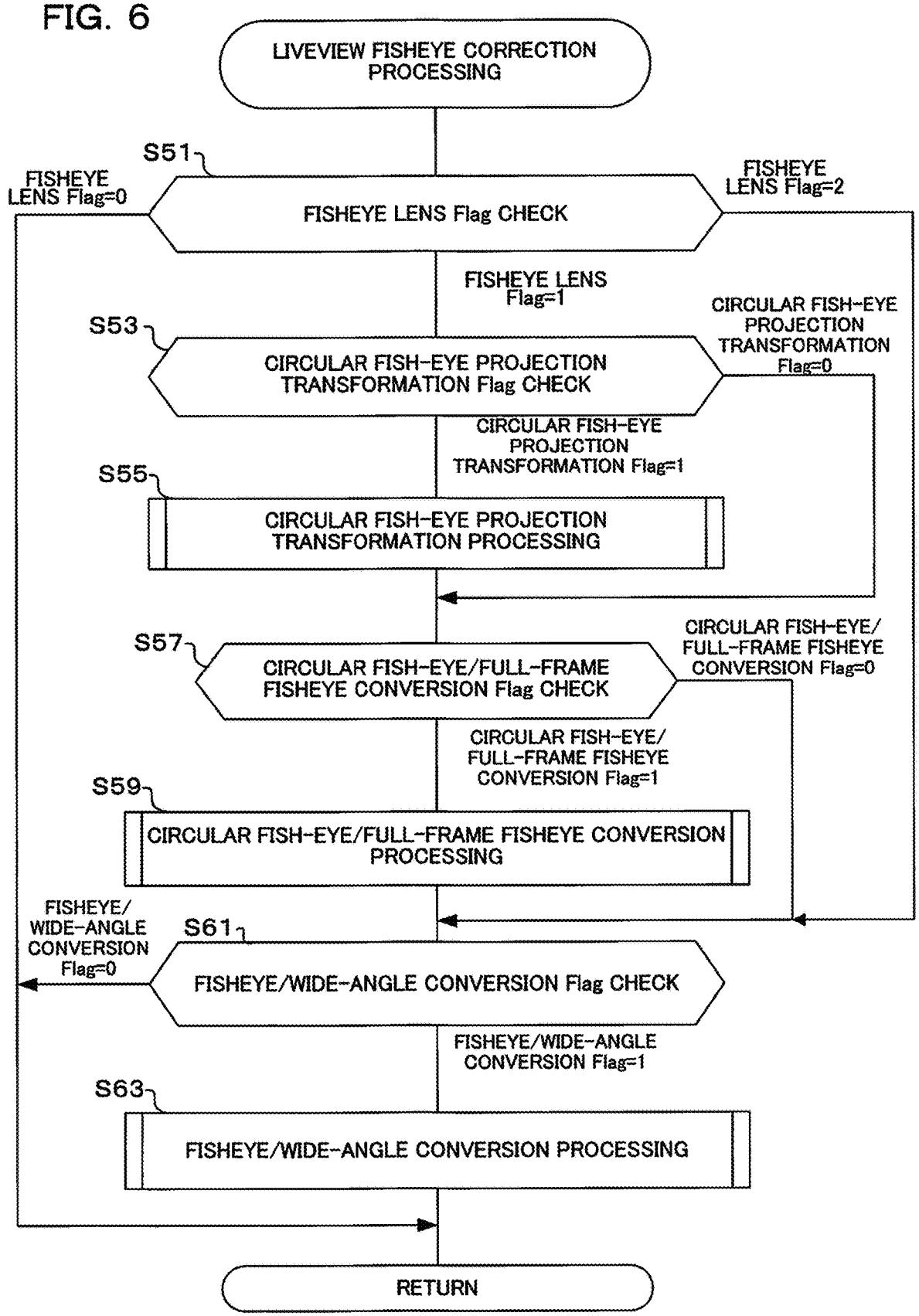
FIG. 6 is a flowchart showing operation for live view fisheye correction processing of the camera of one embodiment of the present invention.

Also, in a case where a fisheye lens that has been attached to the camera has strong peripheral distortion, with this embodiment an image that has this peripheral distortion corrected is generated (refer to S3 in FIG. 3, and to FIG. 6). AF regions and/or photometric domains on this corrected image, and AF regions and/or photometric domains on the image sensor, are out of alignment. In a case where an image having had distortion corrected is subjected to live view display, AF is performed in a specified area on the imaging surface corresponding to a center of an AF region that is displayed superimposed on the live view (refer to S9 in FIG. 3, and FIG. 11). The same also applies to photometry areas (refer to S13 in FIG. 3 and to FIG. 12).

Figure 1:
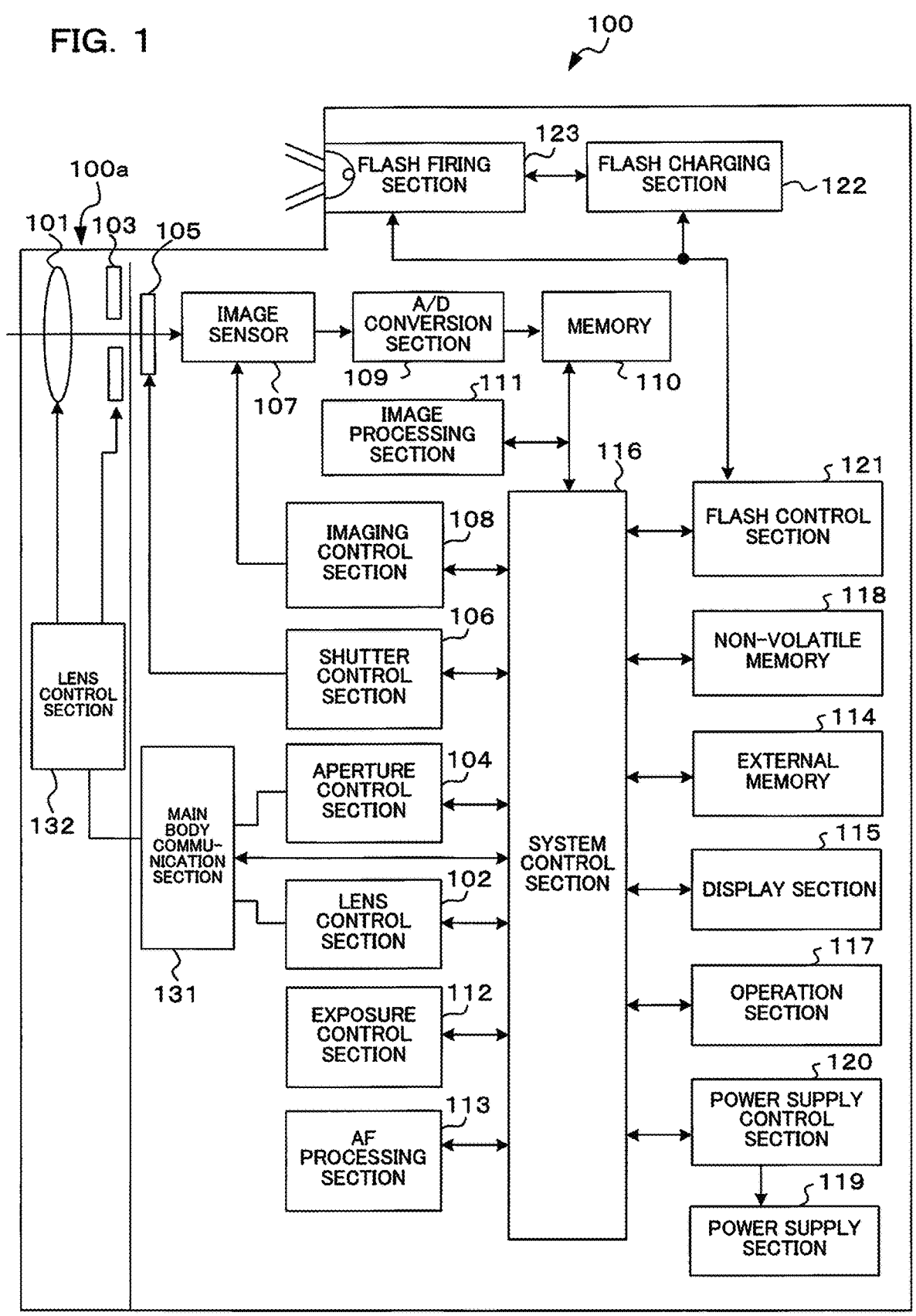
FIG. 1 is a block diagram mainly showing the electrical structure of a camera of one embodiment of the present invention.

FIG. 1 is a block diagram mainly showing the electrical structure of a camera 100 of one embodiment of the present invention. An aperture mechanism 103, shutter 105 and image sensor 107 are arranged on the optical axis of a photographing lens 101. Output of the image sensor 107 is connected to an A/D converter section 109, and output of the A/D converter section 109 is connected to a memory 110. The memory 110 is connected to an image processing section 111 and a system control section 116. A photographing lens 101 and the aperture mechanism 103 are arranged inside a lens barrel 100a, and this lens barrel 100a is capable of being attached to the camera body 100. Specifically, description will be given using an interchangeable lens type single lens camera. Also, as will be described later, connection between the camera body and the lens barrel is performed using a communication section.

An imaging control section 108, shutter control section 106, aperture control section 104, lens control section 102, exposure control section 112, AF processing section 113, flash control section 121, non-volatile memory 118, external memory 114, display section 115, operation section 117 and power supply control section 120 are respectively connected to the system control section 116. The imaging control section 108 is connected to an image sensor 107, and the shutter control section 106 is connected to a shutter 105. The aperture control section 104 is connected by means of a main body communication section 131 and the lens control section 132 to an aperture 103, and the lens control section 102 is connected to a lens control section 132 of the photographing lens 100a by means of the main body communication section 131. Also, the power supply control section 120 is connected to a power supply section 119, and the flash control section 121 is respectively connected to a flash charging section 122 and a flash firing section 123.

The photographing lens 101 is an optical system for concentrating subject light flux onto the image sensor 107, to form a subject image. This photographing lens 101 has drive controlled in an optical axis direction by a lens control section 102, and focus state of the photographing lens 101 is changed by the movement. The lens control section 102 is operated in accordance with instructions from the system control section 116.

The lens control section 132 is provided inside the lens barrel 100a, and has a control section that has a processor such as CPU etc., and a communication circuit. Also, the lens control section 132 has a lens drive circuit and a lens drive mechanism for driving the photographing lens 101. Also, the lens control section 132 has an aperture drive circuit for driving the aperture mechanism 103, and controls aperture opening amount. The lens control section 132 also performs communication with the main body control section 131.

The main body communication section 131 has a communication circuit, and can perform communication with the lens control section 132 if the lens barrel 100a is attached camera body 100. The main body communication section 131 is connected to the system control section 116, aperture control section 104 and lens control section 102, and performs communication between these sections. The main body communication section 131 performs communication of lens information, such as lens barrel type, focal length, aperture information, etc., when the lens barrel 100a has been attached (refer to S31 in FIG. 5). The main body communication section 131 functions has a lens communication circuit (lens communication section) that performs communication with a lens that has been attached, and acquires lens information.

Subject light flux passes through the photographing lens 101 and is incident on the image sensor 107. The aperture mechanism 103 adjusts incident amount of this subject light flux. Opening amount of the aperture mechanism 103 is controlled by the aperture control section 104, with the aperture control section 104 having an aperture control circuit and being operated in accordance with instructions from the system control section 116.

The shutter 105 opens and closes the above described subject light flux, and a known lens shutter or focal plane shutter etc. is used. Shutter opening time (shutter speed value) of the shutter 105 is controlled by the shutter control section 106. The shutter control section 106 has a shutter control circuit, and is operated in accordance with commands from the system control section 116.

The image sensor 107 is a two-dimensional solid image sensor such as a CMOS (Complementary Metal-Oxide-Semiconductor) image sensor or a CCD (Charge Coupled Device) image sensor. The image sensor 107 has RGB color filters and photoelectric conversion elements (pixels). The RGB color filters are color filters of a Bayer array that is arranged on a front surface of the image sensor 107. The photoelectric conversion elements (pixels) are arranged corresponding to the RGB color filters, and photo-diodes etc. are used. Pixel groups are made up of RGB color filters and respectively corresponding photoelectric conversion elements, and an imaging region is determined by pixel groups.

The image sensor 107 receives light that has been condensed by the photographing lens 101 using each of the photoelectric conversion elements (pixels), and each photoelectric conversion element converts the light to photoelectric current in accordance with received light amount. The image sensor 107 accumulates photoelectric current that has been converted in respective capacitors, and charge that has been accumulated in the capacitors is output to the A/D converter section 109 as an analog voltage signal (image signal). The imaging control section 108 has an imaging control circuit, and performs operational control of the image sensor 107 in accordance with commands from the system control section 116.

As photoelectric conversion elements (pixels), the above described photoelectric conversion elements are image signal output pixels. Besides this, as photoelectric conversion elements (pixels) there are phase difference detection pixels. Phase difference detection pixels output signals for light that has passed through the photographing lens on only one of a left side and a right side (or may also be only the upper side or the lower side). An output signal from the phase difference detection pixels is output to the AF processing section 113. Photometric domains and/or AF regions are arranged on the image sensor.

The A/D converter section 109 has an A/D conversion circuit, and converts an analog voltage signal (image signal) output from the image sensor 107 into a digital image signal (image data). The memory 110 is an electrically rewritable memory, and temporarily stores various data, such as image data acquired in the A/D converter section 109 and image data that has been subjected to processing in the image processing section 111. It should be noted that in this specification, as long as a signal is based on an image signal output from the image sensor 107 it will be referred to as image data, and this includes image processed signals, not only a signal that has been subjected to A/D conversion by the A/D converter section 109.

The image processing section 111 has an image processing circuit, and applies image processing to image data. Specifically, the image processing section 111 performs image processing such as white balance correction processing, demosaicing processing and color conversion processing on image data that has been temporarily stored in the memory 110. The image processing section 111 also performs image compression of image data at the time of storage in the external memory 114, which will be described later, and expansion of compressed image data that has been read out from the external memory 114.

Also, the image processing section 111 applies fisheye correction processing to image data (refer to S3 in FIG. 3, and to FIG. 6). Also, the image processing section 111 can perform projection transformation processing for any of orthogonal projection, equidistant projection, equisolid angle projection, or solid angle projection, on the image that has been formed by the circular fisheye lens (S55 in FIG. 6). The image processing section 111 also converts an image that has been formed by a circular fisheye lens to an image that is equivalent to having formed with a full-frame fisheye lens (refer to S59 in FIG. 6). Also, the image processing section 111 performs image processing using a distortion characteristic that is opposed to a distortion characteristic of a fisheye lens, in order to convert a projection method of an image that has been formed by a fisheye lens to an image that is equivalent to having been formed by a wide angle lens (refer to fisheye/wide-angle conversion, S63 in FIG. 6, and FIG. 16).

Also, the image processing section 111 performs underwater distortion correction connection for an image that has been subjected to fisheye/wide-angle conversion, and corrects distortion of an image due to difference in refractive index between in air and in water (refer to FIG. 19). Also, the image processing section 111 performs aspect ratio linked trimming on an image that has been subjected to fisheye/wide-angle conversion, and crops a direct image at an aspect ratio that is set for a fisheye image that has been generated (refer to FIG. 20, FIG. 21A and FIG. 21B). The image processing section 111 functions as an image processing circuit (fisheye image correction section) that corrects an image of an imaging range of a fisheye lens (refer to S55, S59 and S63 in FIG. 6). This image processing circuit (fisheye image correction section) corrects a fisheye image using fisheye/wide-angle conversion and/or projection method conversion. In a case where an image has been corrected using the fisheye correction section, AF regions are restricted to one.

The exposure control section 112 has an exposure control circuit, and calculates subject brightness (brightness of a scene containing the subject) using image data that has been temporarily stored in the memory 110. There is obviously no problem in calculating subject brightness using a dedicated photosensor. Also, calculation of subject brightness may be performed using the system control section 116.

An AF (Auto Focus) processing section 113 has an AF processing circuit, and detects focus state of a photographing lens in an AF region that has been manually or automatically set. As an AF detection method, there is contrast AF and phase difference AF. With contrast AF, high frequency components are extracted from image data temporarily stored in the memory 110, and a contrast value is acquired using integration processing. The system control section 116 carries out drive control so as to bring the photographing lens 101 to an in-focus position, based on the contrast value. With phase difference AF only a signal from phase difference detection pixels within the image sensor 107 is extracted, and a phase difference is detected. The system control section 116 then performs drive control so that the photographing lens 101 reaches an in-focus position based on the phase difference (focus shift amount) that has been detected.

The operation section 117 is an interface for the photographer to input commands to the camera, and includes operation members such as a power supply button, release button, shooting mode dial, movie button, function button, cross shaped button 117c (refer to FIG. 17A and FIG. 17B), OK button, menu button, and various input keys etc. The operation section 117 may also have a touch panel or the like. The touch panel is arranged on a front surface of the display section 115, and detects a touch state of the photographer. If a user operates any of the operations members of the operation section 117, the system control section 116 executes various sequences according to the user operation. Menu selection using the cross shaped button 117c may also be performed by touch operation.

The power supply button within the operation section 117 is an operation member for instructing to turn a power supply of the camera 100 on or off, and if the power supply button is pressed the power supply of the system control section 116 is turned on, while if it is pressed again the power supply is turned off. If the power supply is turned on, operation of the main flow (refer to FIG. 3) which will be described later is commenced, and live view display etc. is performed.

The release button 117 has a two-stage switch with a 1st release switch and a 2nd release switch. If the release button 117 is pressed down halfway, the 1st release switch is turned on, and if the release button is pressed down further from the halfway point to a fully pressed state the 2nd release switch is turned on. If the 1st release switch is turned on, the system control section 116 executes shooting preparation sequences such as AE processing and AF processing. If the 2nd release switch is turned on, the system control section 116 executes a shooting sequence. In a shooting sequence an image for a still picture is acquired, and that image is stored.

The system control section 116 is constructed with a processor and is made up of an ASIC (application-specific integrated circuit) including a CPU (central processing unit) etc. The system control section 116 performs unified control of various sequences of the camera 100, such as for the imaging control section 108 and the flash control section 121, by executing programs that have been stored in the non-volatile memory 118.

Also, the system control section 116 performs communication with the lens control section 132, and acquires lens information such as type of the lens. The system control section 116 functions as a processor (circular fisheye lens detection section) that detects whether or not a lens that has been attached is a circular fisheye lens based on lens information (refer to S33 and S37 in FIG. 5). The system control section 116 functions as a processor (fisheye lens detection section) that detects whether or not a lens that has been attached is a fisheye lens, based on lens information (refer to S33, S37 and S39 in FIG. 5). If it has been determined by the processor (circular fisheye lens detection section) that the attached lens is a circular fisheye lens, AF regions are restricted to one (refer to S77 in FIG. 9).

Figure 7:
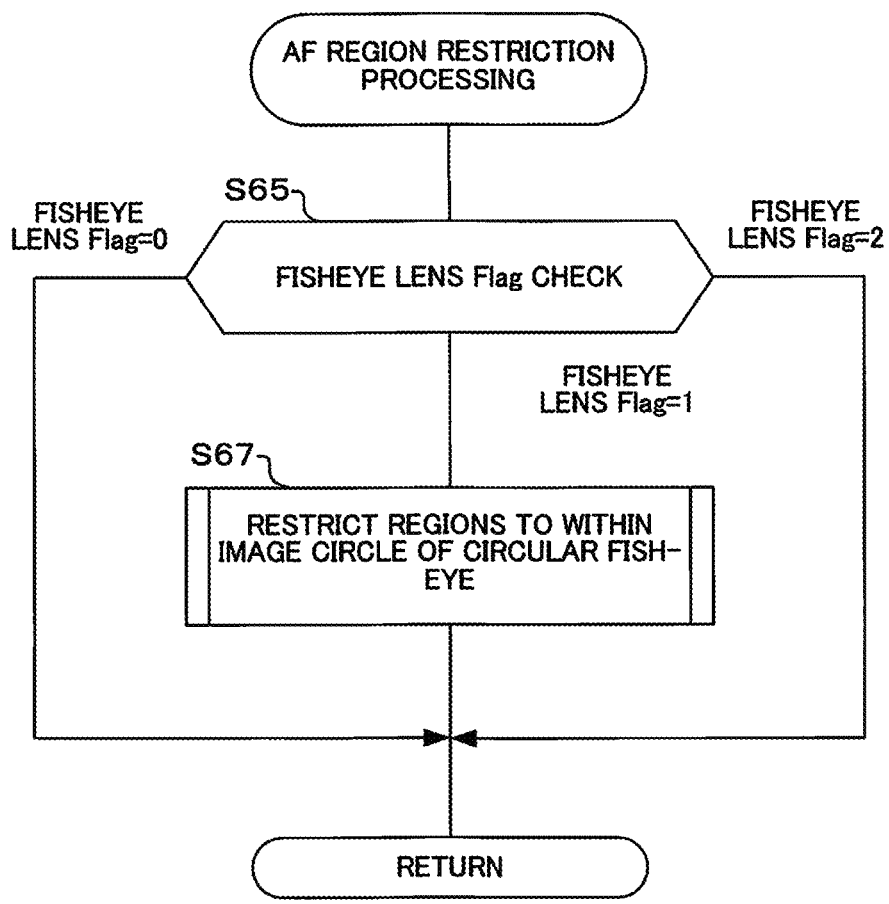
FIG. 7 is a flowchart showing operation of AF region control processing of the camera of one embodiment of the present invention.
Figure 8:
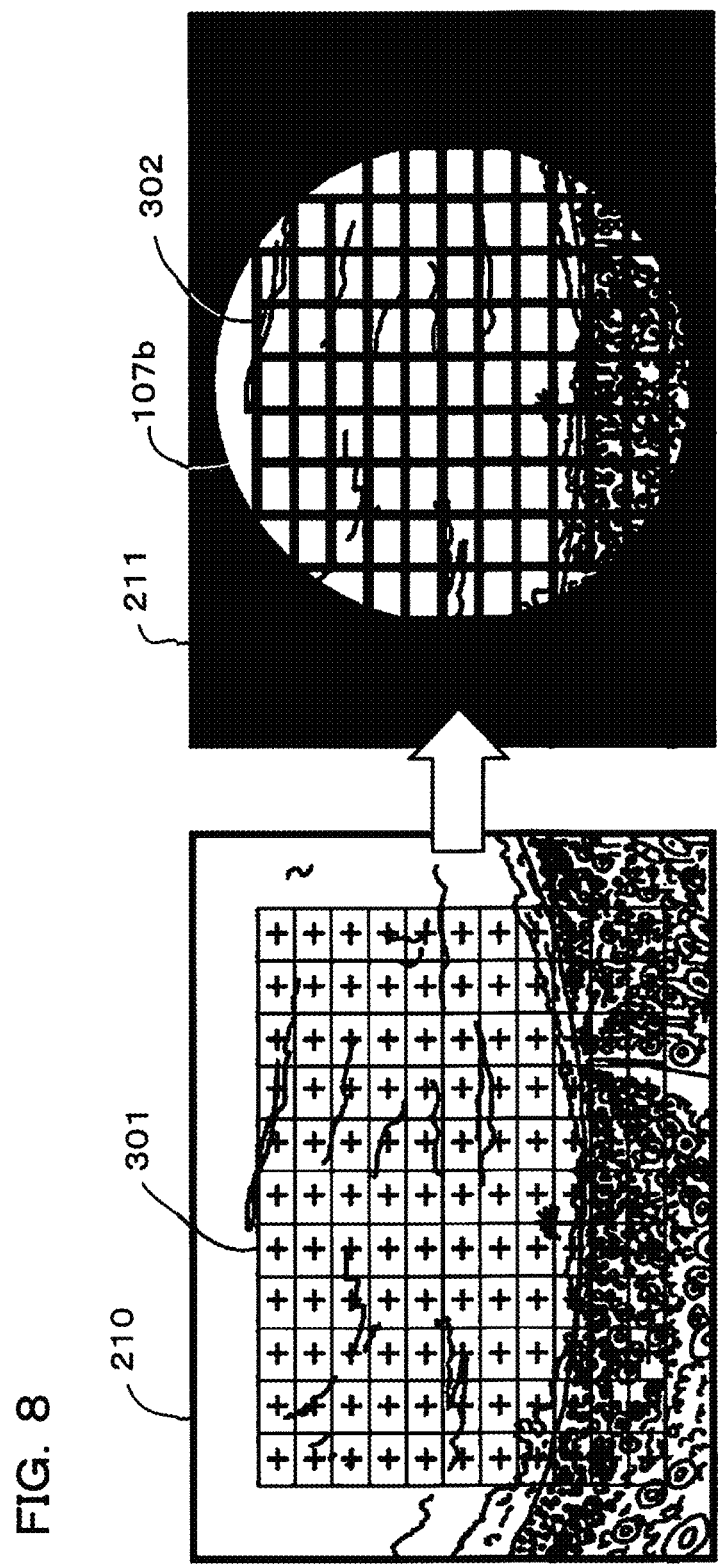
FIG. 8 is a drawing for describing the fact that AF region is restricted within an image circle, in the case of a circular fish-eye, in the camera of one embodiment of the present invention.

The system control section 116 also functions as a processor (restriction section) that restricts photometric domain and/or AF region based on the image circle of the circular fisheye lens, in the event that it has been determined by the circular fisheye lens detection section that the attached lens is a circular fisheye lens (refer to S67 in FIG. 7 and to FIG. 8). This processor (restriction section) restricts a mode for setting AF regions (refer to S77 in FIG. 9).

Figure 5:
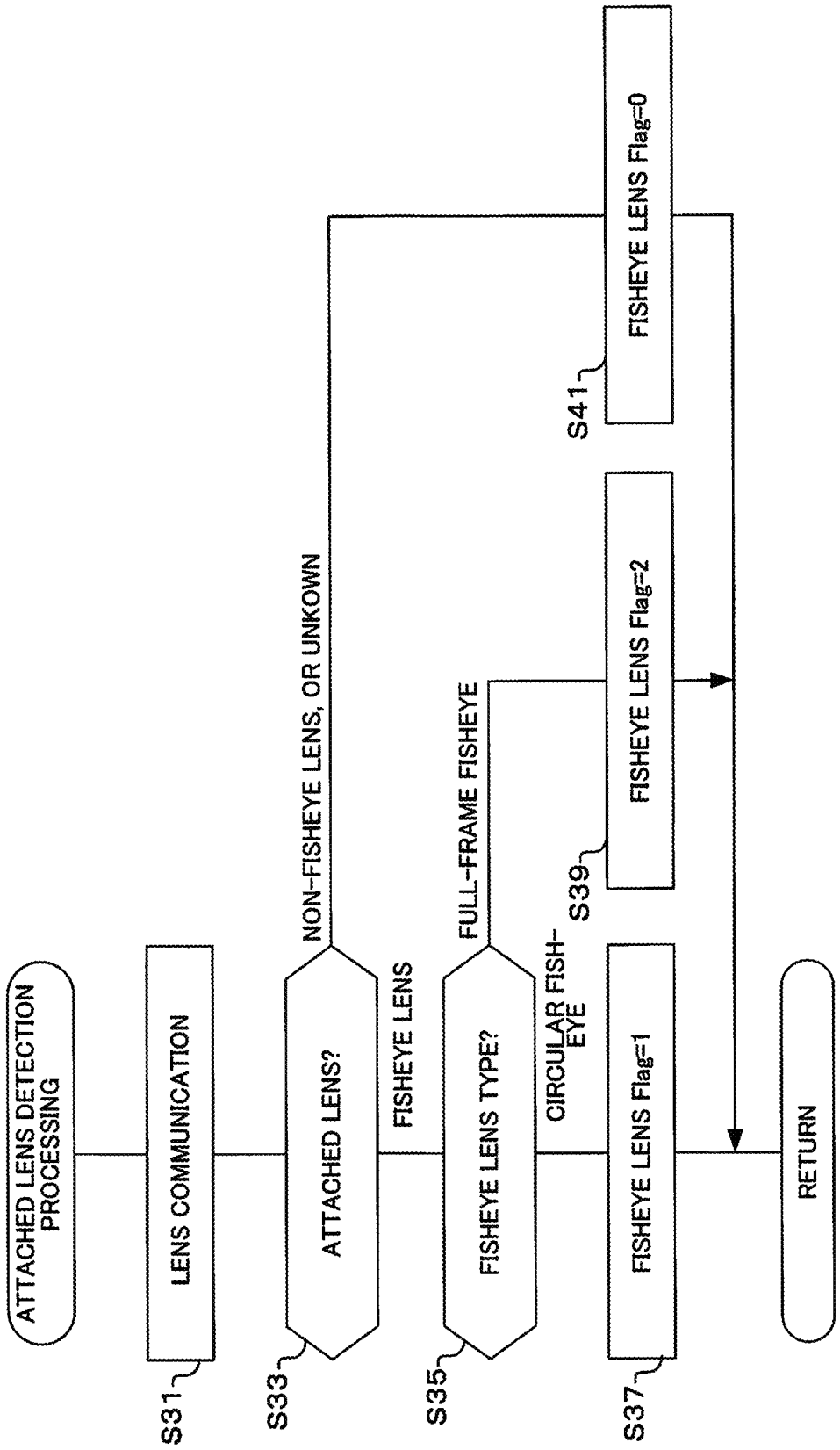
FIG. 5 is a flowchart showing operation of attached lens detection processing for the camera of one embodiment of the present invention.

The system control section 116 also functions as a processor (fisheye lens detection section) that detects whether or not a lens that has been attached is a fisheye lens, based on lens information (refer to S33 S37 and S39 in FIG. 5). Also, the system control section 116 functions as a processor (projection method changing section) that changes a projection method for an image that has been formed by a circular fisheye lens (refer to S157 to S171 in FIG. 27). The above-described processor (restriction section) restricts a mode for setting AF regions in the event that the projection method has been changed by the projection method changing section (refer to S77 in FIG. 9). This processor (restriction section) restricts AF regions to one (refer to S77 in FIG. 9). The processor (restriction section) may also display AF regions that have been restricted in the event that a circular fisheye lens has been determined by the circular fisheye lens detection section (refer to S77 in FIG. 9).

Figure 11:
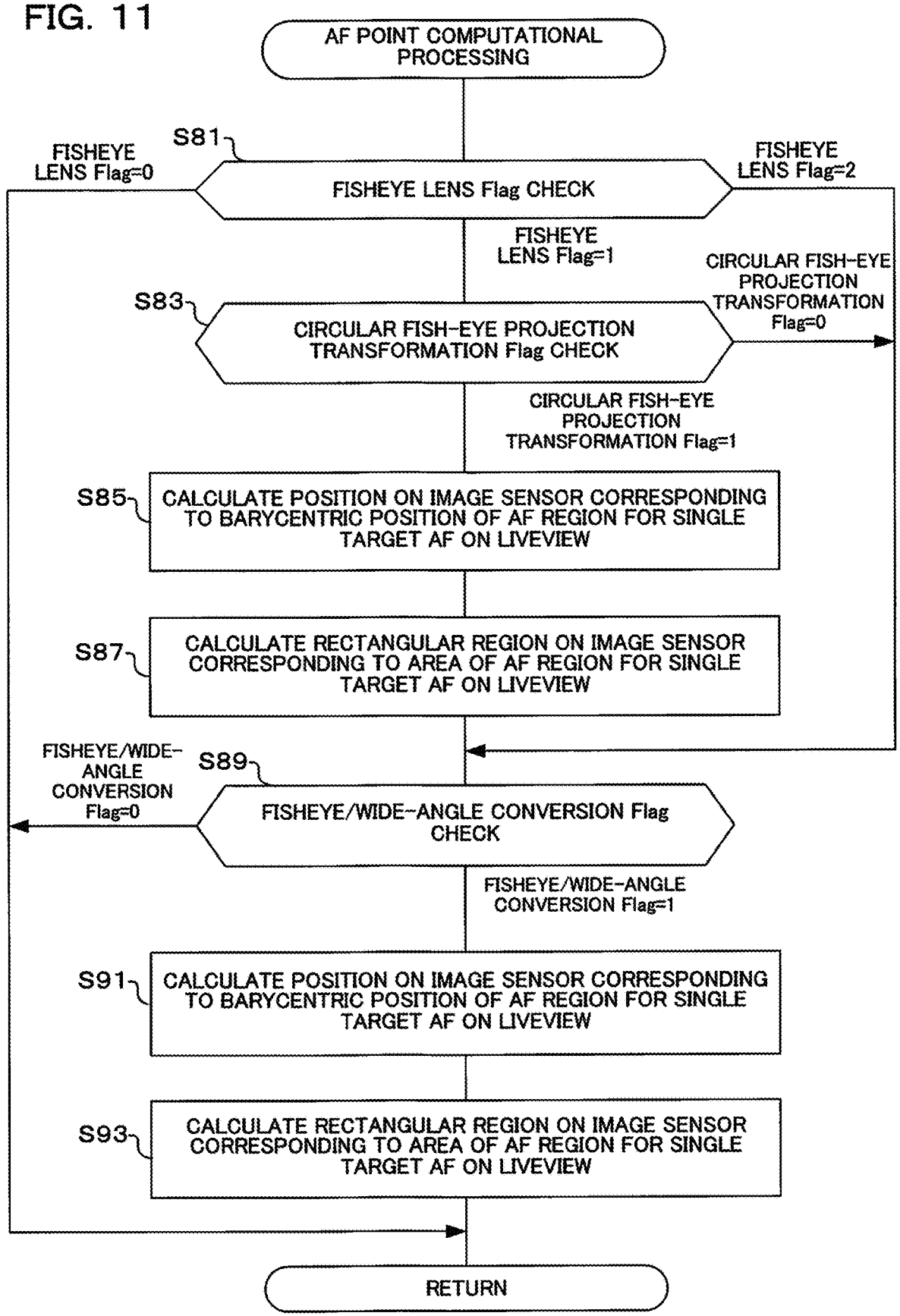
FIG. 11 is a flowchart showing operation of AF point computational processing of the camera of one embodiment of the present invention.
Figure 12:
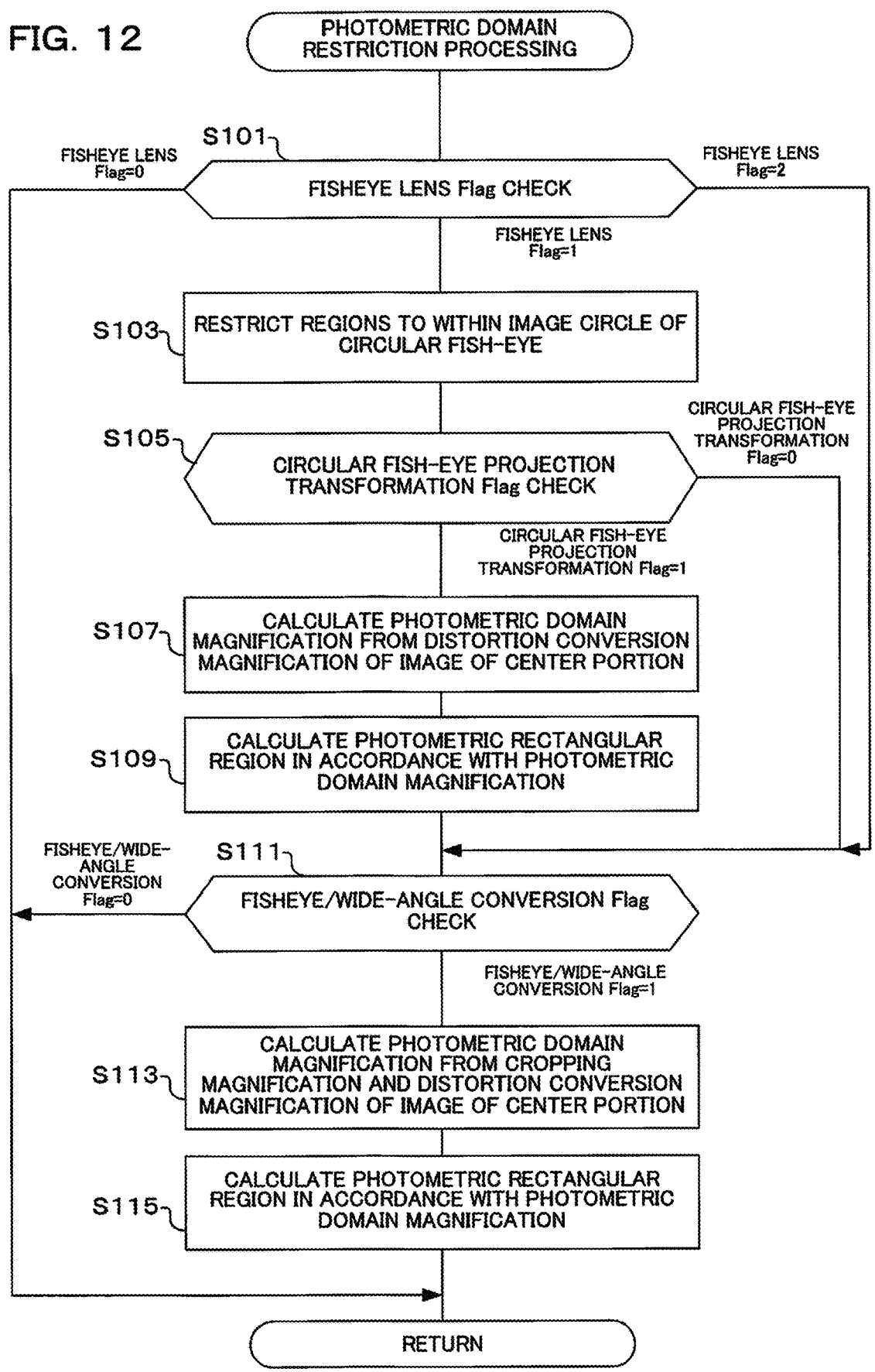
FIG. 12 is a flowchart showing operation of photometric domain restriction processing of the camera of one embodiment of the present invention.

Also, the system control section 116 functions as a processor (calculation section) that calculates position on a display section for photometric domains and/or AF regions in the event that an image has been corrected by the fisheye correction section, or performs a calculation so that area substantially conforms to position and area on the image sensor (refer to S85, S87, S91 and S93 in FIG. 11, and S107, S109, S113 and S114 in FIG. 12). The system control section 116 functions as a processor (calculation section) that converts coordinates of AF regions on a live view image to coordinates of AF regions on the image sensor (refer to S85, S87, S91 and S93 in FIG. 11).

The external memory 114 is an electrically rewritable non-volatile memory and is, for example, a storage medium that is inserted into and taken out of the camera body, and stores image data that has been compressed in the image processing section 111, and its associated data. Image data that has been stored in the external memory 114 is also read out and playback displayed on the display section 115. It should be noted that a storage medium for storing image data etc. is not limited to the external memory 114 that is inserted into or removed from the camera body, and can be a storage medium such as a hard disk built in to the camera body.

The display section 115 is a display, and includes a liquid crystal monitor or the like arranged on a rear surface of the camera body, and live view display is performed based on image data. The display section 115 also performs playback display of taken images that have been stored in the external memory 114, and performs display of exposure control values etc. and display of menu screens for settings such as shooting mode etc. The display section 115 is not limited to a liquid crystal monitor as long as it can display images etc., and may also be a display such as organic EL. The display section 115 functions as a display that performs live view display of an image that has had projection method changed.

The display section 115 functions as a display that performs live view display of an image that has had projection method changed by the projection method changing section. Also, the display section 115 functions as a display that displays an image after correction by the fisheye image correction section as a live view image (refer to S15 in FIG. 3).

The non-volatile memory 118 is an electrically rewritable non-volatile memory, and stores various parameters that are required for operation of the camera 100. The non-volatile memory 118 also stores programs executed by the system control section 116. The system control section 116 reads out parameters stored in the non-volatile memory 118, and executes various sequences, in accordance with programs stored in the non-volatile memory 118.

The power supply section 119 supplies power necessary for operation of each section of the camera 100, and has, for example, a power supply battery such as a secondary cell. The power supply control section 120 has a power supply control circuit, and performs control of the power supply section 119, such as detecting power supply voltage and remaining capacity of the battery.

The flash control section 121 has a flash control circuit, and controls a charging operation of the flash charging section 122, and a firing operation of the flash firing section 123, in accordance with instructions from the system control section 116. The flash charging section 122 comprises a boost circuit for boosting the power supply voltage of the power supply section 119, and a capacitor for holding energy at the voltage that has been boosted, and holds the energy required to fire the flash firing section 123. The flash firing section 123 is provided with a reflector and an arc tube such as a xenon (Xe) tube, for example. The flash firing section 123 emits light using energy that has been stored in the capacitor of the flash charging section 122 when a firing command has been received from the flash control section 121.

Next, description will be given of a circular fisheye lens and a full-frame fisheye lens that are capable of being fitted to a camera of this embodiment, using FIG. 2A and FIG. 2B. FIG. 2A shows a circular fisheye lens, while FIG. 2B shows a full-frame fisheye lens.

The upper part of FIG. 2A shows a relationship between imaging surface 107a and an image circle 107b of the image sensor 107, for a camera body that has been fitted with a circular fisheye lens. The image circle 107b shows range of a subject image that is formed by the circular fisheye lens. As will be understood from FIG. 2A, in the case of a circular fisheye lens the diameter of the image circle 107b is contained within the imaging surface 107a. Also, the lower part of FIG. 2A shows a relationship between a taken image 201 and a subject image 201a that has been formed by the circular fisheye lens. In the case of a circular fisheye lens, there is no image that is within the taken image 201 and outside the subject image 201a that is within the image circle 107b, which means that with the example shown in FIG. 2A black is displayed.

The upper part of FIG. 2B shows a relationship between imaging surface 107a and an image circle 107c of the image sensor 107, for a camera body that has been fitted with a full-frame fisheye lens. The image circle 107c shows range of a subject image that is formed by the full-frame fisheye lens. As will be understood from FIG. 2B, in the case of a full-frame fisheye lens the diameter of the image circle 107c is equal to or longer than a diagonal line of the imaging surface 107a. The lower part of FIG. 2B shows a subject image 202 that has been formed by the full-frame fisheye lens. In the case of a full-frame fisheye lens the subject image within the image circle 107c and the imaging surface 107a have the same range. This means that a subject image such as a live view image and an image that has already been stored can be displayed on the whole screen.

Next, operation of the camera 100 of this embodiment will be described using FIG. 3, FIG. 5 to FIG. 7, FIG. 9, FIG. 11, and the flowchart shown in FIG. 12. This flow is realized by the CPU within the control section 116 of the camera 100 executing programs that have been stored in memory.

If the power supply of the camera 100 is turned on, flow for the main operation shown in FIG. 3 is commenced. If the main flow commences operation, first detection processing for a fitted lens is executed (S1). In this step, it is determined whether or not a lens has been attached to the camera 100. Regarding whether or not a lens has been attached, the camera body performs communication with the lens barrel, and if communication is established between the camera body and the lens barrel it is determined that a lens has been attached. Also, if a lens has been attached, the type of the lens is also detected. It should be noted that in a case where a lens attachment detection sensor has been provided in the camera body, determination may also be based on detection results from this lens attachment detection sensor. Detailed operation of the lens attachment detection processing will be described using FIG. 5 which will be described later.

Once attached lens detection processing has been executed, next live view fisheye correction processing is executed (S3). In this step, in the event that a fisheye lens has been attached to the camera body, the image processing section 111 performs correction processing on image data that has been acquired by the image sensor 107. This correction processing is in order to perform live view display in step S15 which will be described later. As the correction processing in this step, there is, for example, processing to perform projection transformation on an image that has been acquired with a circular fisheye lens, and processing to convert an image that has been acquired by a circular fisheye lens to an image that is equivalent to having been acquired with a full-frame fisheye lens. By performing this full-frame fisheye conversion, it is possible to convert from a circular image to a rectangular image (refer to FIG. 2A and FIG. 2B).

As live view fisheye correction processing in step S3, there is further processing (fisheye/wide-angle conversion processing) for converting from an image that has been acquired with a fisheye lens to an image that is equivalent to an image that has been acquired with a wide-angle lens. Fisheye/wide-angle conversion processing is processing that is performed on an image that has been formed with a fisheye lens to perform image cropping from an image after distortion correction processing to negate distortion of the fisheye lens and processing in accordance with aspect ratio. Detailed operation of the live view fisheye correction processing will be described using FIG. 6 which will be described later.

Once live view fisheye correction processing has been executed, next restriction processing for AF regions is executed (S5). Regions in which AF detection is possible before correction processing can be arranged on the whole area of the screen, and this AF region setting can be performed manually or automatically. In this step, in a case where a circular fisheye lens has been attached a range of AF regions that have been set is restricted to conform to the image circle of the circular fisheye lens. Also, besides this restriction, there may be restriction in accordance with a distortion characteristic of the fisheye lens. Detailed operation of the AF region restriction processing will be described using FIG. 7 which will be described later.

Once restriction processing for AF regions has been executed, next AF target mode restriction processing is executed (S7). AF target mode is a mode relating to setting of AF regions, and will be described in detail using FIG. 10A to FIG. 10D. In this step, in a case where a circular fisheye lens has been attached, setting of AF region is restricted in accordance with AF target mode that has been set. The detailed operation of restriction processing accompanying mode change of AF target mode will be described using FIG. 9 which will be described later.

Once AF target mode restriction processing has been executed, next AF point computational processing is performed (S9). An image formed by a fisheye lens is distorted. In a case where this distorted image has been subjected to projection transformation, or in the case where fisheye/wide-angle conversion has been performed, AF regions that are displayed on the image sensor and AF regions that are displayed on a live view image will be different. In this step, when performing live view display, position on the image sensor is calculated from position on live view so that position of AF regions for live view display substantially coincide with positions of AF regions on the image sensor. Conversely, positions on a live view image may be calculated from positions that have been arranged on the image sensor, and display performed on live view. Detailed operation of the AF point computational processing will be described using FIG. 11 which will be described later.

Once AF point computational processing has been executed, next restriction processing for photometric domains is executed (S11). For photometric domains also, similarly to AF regions (refer to step S5), in a case where a circular fisheye lens has been attached a range for photometric domains that are set is restricted. Detailed operation of the photometric domain restriction processing will be described using FIG. 12 which will be described later.

Once photometric domain restriction processing has been executed, next photometry point computational processing is executed (S13). For photometric domains also, similarly to the AF point computational processing (refer to 89), when performing live view display positions on the image sensor and positions for live view display etc. are calculated so that photometric domains are substantially the same as positions on the image sensor. As a detailed operation of the photometry point computational processing, calculation for size of photometric domains is described, in the flow for photometric domain restriction processing shown in FIG. 12. For position of photometric domains, in the flowchart for AF point computational processing of FIG. 11 processing such as changing an AF region to a photometric domain may be performed.

Next, live view display is performed (S15). In this step, the image processing section 111 performs image processing for live view display based on an image data that has been acquired by the image sensor 107. A live view image is displayed on the display section 115 on the basis of this image data that has been processed. Also, in a case where a fisheye lens has been attached to the camera body, an image that was corrected in step S3 is displayed, and in the event that restriction processing etc. was performed in steps S5 to S13 an AF region and photometric domain that have been subjected to processing are displayed. It should be noted that the live view image is updated every time a time corresponding to the frame rate for readout of the image sensor 107 elapses.

If live view display has been performed, it is next determined whether or not the 1st release switch is on (S17). If the photographer decides on a photographed object, the release button is pressed halfway. In this step, the operation section 117 detects state of the 1st release switch, and determination is based on this detection result. If the result of this determination is that the 1st release switch is off, processing returns to step S1.

If the result of determination in step S17 is that the 1st release switch is on, 1st ON processing is executed (S19). In this step, the exposure control section 112 measures brightness value, and the system control section 116 calculates exposure control values (aperture value, shutter speed value) to achieve appropriate exposure based on this brightness value. Also, the AF processing section 113 and the system control section 116 move the photographing lens 101 to an in-focus position using contrast AF or phase difference AF.

Once 1st ON processing has been executed, it is next determined whether or not the 2nd release switch is on (S21). The photographer presses the release button down fully when there is a photo opportunity. In this step, the operation section 117 detects state of the 2nd release switch, and determination is based on this detection result. If the result of this determination is that the 2nd release switch is off, step S1 is returned to.

If the result of determination in step S21 is that the 2nd release switch is on, still picture shooting is executed (S23). In this step, the system control section 116 performs control of the aperture 103 and the shutter 105 in accordance with the exposure control values that were calculated in step S19. If the shutter 105 is closed, the system control section 116 reads out image data from the image sensor 107, image processing for storage is performed in the image processing section 111, and this image data is stored in the external memory 114. Once still picture shooting is completed, processing returns to step S1.

Next, flags that are used in the flowcharts shown in FIG. 5 to FIG. 7, FIG. 9, FIG. 11 and FIG. 12 will be described using FIG. 4. These flags are used when a fisheye lens has been fitted to the camera body. In FIG. 4, the left column shows flag name, and the columns on the right show numerical values of flags and the meaning of those numerical values.

The fisheye lens flag is a flag that represents the type of interchangeable lens that is attached to the camera body. If the interchangeable lens is a circular fisheye lens the flag=1, if it is a full-frame fisheye lens the flag=2, and if it is not a fisheye lens (non-fisheye) the flag=0 (refer to S37 to S41 in FIG. 5). A fisheye/wide-angle conversion flag is a flag that represents whether or not fisheye/wide-angle conversion processing is executed. In the event that this conversion processing is permitted (valid) the fisheye/wide-angle conversion flag=1, while if this conversion processing is prohibited (invalid) the fisheye/wide-angle conversion flag=0 (refer to S123 and S125 in FIG. 26).

A wide angle of view flag represents degree of angle of view of a changed image in a case where an image is converted to a wide-angle image. The wide angle of view flag=1 represents angle of view 1, wide angle of view flag=2 represents angle of view 2, and wide angle of view flag=3 represents angle of view 3 (refer to S129 to S133 in FIG. 26).

Figure 18:
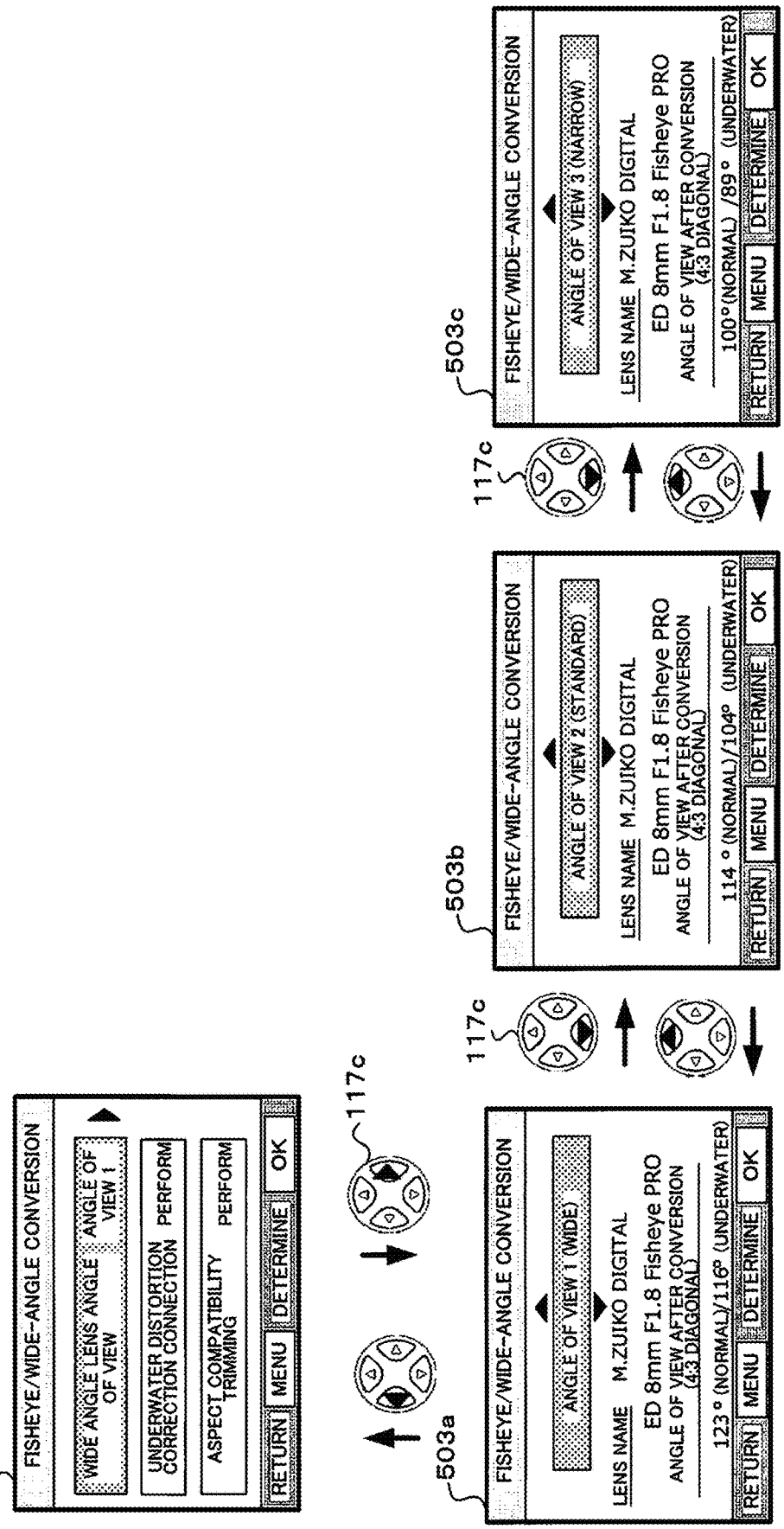
FIG. 18 is a drawing showing examples of menu display in a case of performing fisheye correction (fisheye/wide-angle conversion), in the camera of one embodiment of the present invention.

Specific examples of angles of view 1 to 3 will be described later using FIG. 18. An underwater distortion correction flag is a flag representing whether or not to correct underwater distortion, when the camera 100 is used as an underwater camera. If the camera 100 is underwater, refractive index is different between air and in water, and so appearance of distortion will be different. Underwater distortion correction is correction of image distortion in this underwater case. The underwater distortion correction flag=0 represents that correction will not be performed, while the underwater distortion correction flag=1 represents that correction will be performed (refer to S137 and S139 in FIG. 26).

Figure 26:
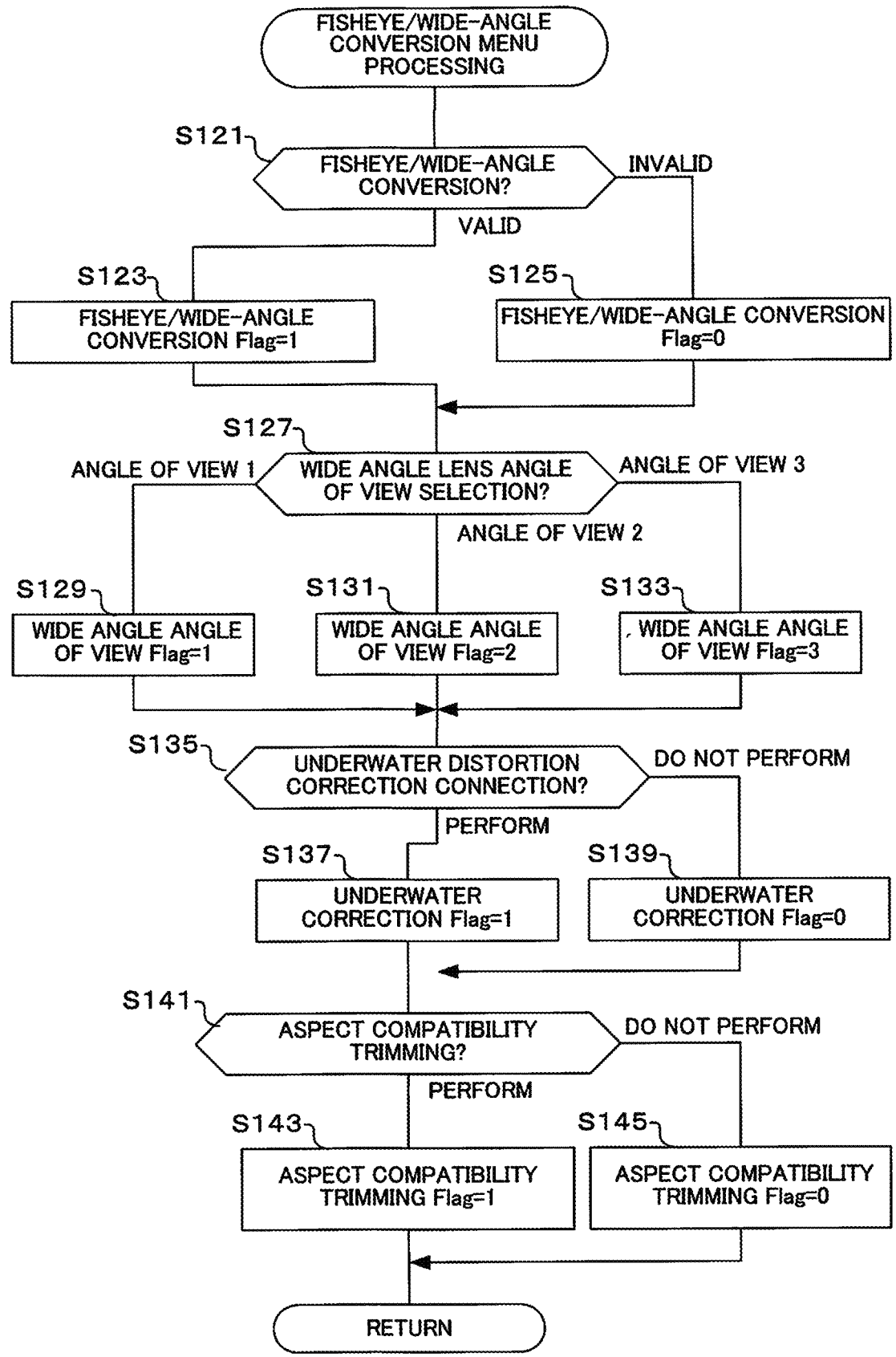
FIG. 26 is a flowchart showing operation for fisheye/wide angle conversion menu processing of the camera of one embodiment of the present invention.

An aspect ratio linked trimming flag is a flag that is used when circular fish-eye/full-frame fisheye conversion is performed on an image that has been formed by a circular fisheye lens, and a rectangular image is cropped (refer to S143 and S145 in FIG. 26). In the case of performing aspect compatibility (aspect ratio linked trimming flag=1), an image is cropped directly at an aspect ratio that has been set. On the other hand, in a case where aspect compatibility is not performed (aspect ratio linked trimming flag=0), an image is temporarily cropped at an aspect ratio that constitutes a reference, and then this cropped image is cropped at an aspect ratio that has been set. This aspect ratio linked trimming will be described later using FIG. 21A and FIG. 21B.

A circular fish-eye/full-frame fisheye conversion flag is a flag representing whether or not circular fish-eye/full-frame fisheye conversion processing will be executed, and if this conversion processing is permitted (valid) the circular fish-eye/full-frame fisheye conversion flag=1, while if this conversion processing is prohibited (invalid) the circular fish-eye/full-frame fisheye conversion flag=0. Circular fish-eye/full-frame fisheye conversion processing is processing to convert an image that has been formed by the circular fisheye lens that was shown in FIG. 2A to an image that has been formed with a full-frame fisheye lens shown in FIG. 2B. Processing for the circular fish-eye/full-frame fisheye conversion will be described using FIG. 16.

A circular fish-eye projection method flag is a flag that represents whether or not projection method of an image that has been formed with a circular fisheye lens will be converted. In the event that this conversion processing is permitted (valid) the circular fish-eye projection method flag=1, while if this conversion processing is prohibited (invalid) the circular fish-eye projection method flag=0 (refer to S151 to S155 in FIG. 27).

Figure 27:
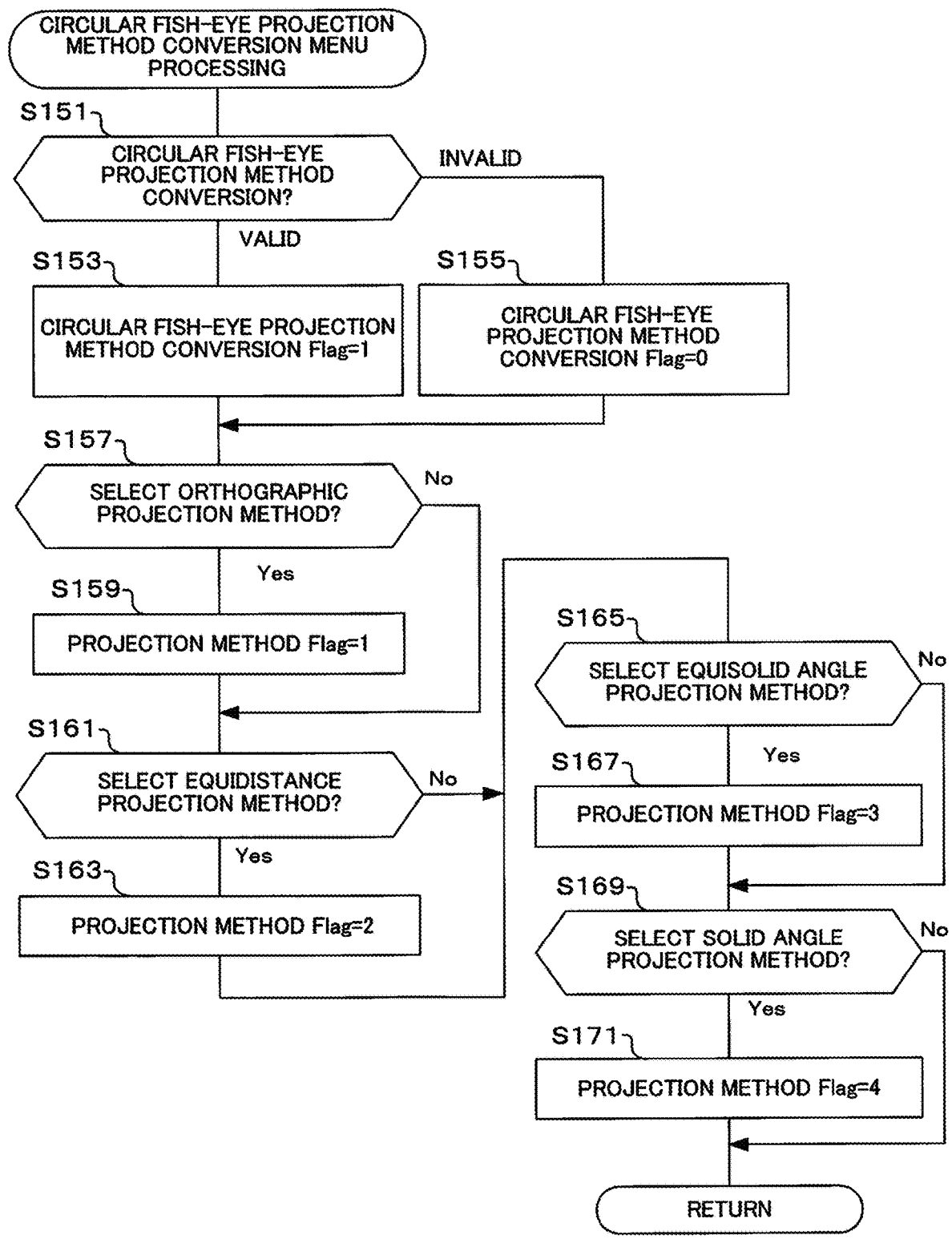
FIG. 27 is a flowchart showing operation for circular fish-eye projection method conversion menu processing of the camera of one embodiment of the present invention.
Figure 28B:
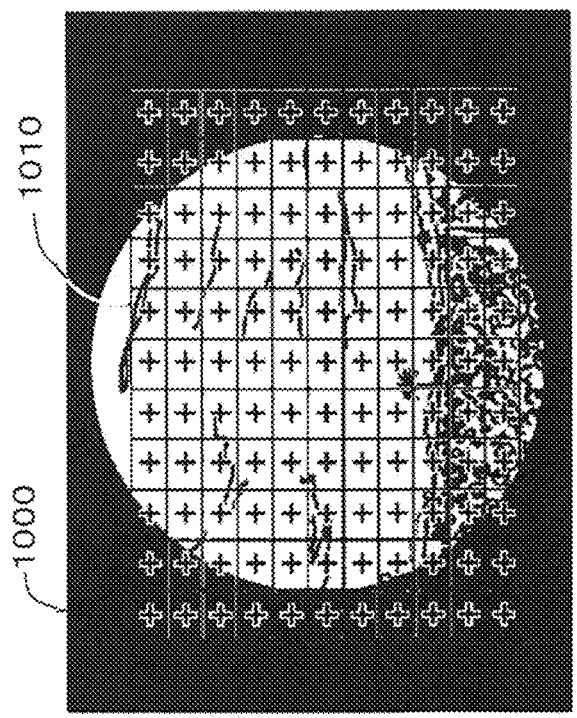
FIG. 28A and FIG. 28B are drawings for describing AF regions or AE regions in a case where a fisheye lens has been attached.
Figure 28A:
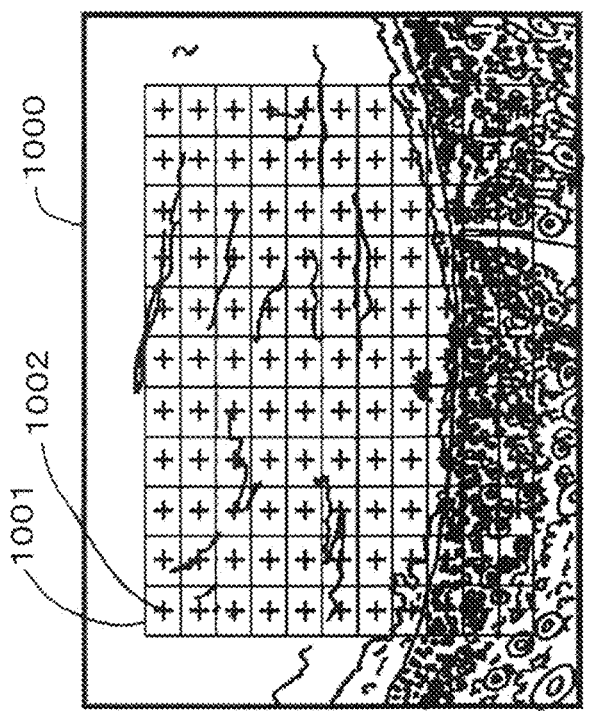

A projection method flag is a flag that represents a type of projection method that will be converted (refer to S157 to S171 in FIG. 27). Projection method flag=1 represents that there will be conversion to orthogonal projection. Projection method flag=2 represents that there will be conversion to equidistant projection. Projection method flag=3 represents that there will be conversion to equisolid angle projection. Projection method flag=4 represents that there will be conversion to solid angle projection.

Orthogonal projection results in an image that has a hemispherical figure projected as is onto a plane. An image that has been taken with an orthographic system fisheye lens has characteristics such that peripheral light amount is not lowered (brightness is uniform at the center and the periphery of the screen). An orthographic system fisheye lens is used in sunshine research and sky brightness distribution measurement, in order to photograph subjects with the same brightness with the same concentration regardless of where they are on the screen.

Equidistant projection results in an image in which distance and angle from the center of the screen are proportional. An equidistance projection method fisheye lens is used in astral body position measurement etc., and most fisheye lenses have this type of projection method. With solid angle projection, an image in the center is magnified by four times compared to a peripheral image. This projection method resembles human vision, and is the same as a perceived spatial image (Optical illusion) such as where the sun and the moon appear larger as they approach the horizon. Also, this solid angle projection method is different in that while with other projection methods an image distorts towards the periphery, there is no such distortion with the solid angle projection.

With equisolid angle projection surface area on the image is proportional to solid angle. With equisolid angle projection it is possible to obtain a proportion of the subject with respect to a field of view by measuring surface area on a screen that has been photographed. For this reason an equisolid angle projection method fisheye lens is used in cloud cover measurement etc. and in position information acquisition, such as in the meteorological field and robotics.

Next, attached lens detection processing (refer to S1 in FIG. 3) will be described using the flowchart shown in FIG. 5. If the flow for attached lens detection processing is commenced, first of all lens communication is executed (S31). In this step, communication is performed between a communication circuit at the camera body side and a communication circuit at the interchangeable lens side. If this communication is established, the interchangeable lens transmits the type of lens that has been attached (for example, circular fisheye lens, full-frame fisheye lens, non-fisheye lens) to the camera body. The interchangeable lens also transmits lens information such as focal length, wide-open aperture value, minimum aperture value (maximum F No.) etc. to the camera body If lens communication has been performed, it is next determined whether or not the lens that has been attached is a fisheye lens (S33). In this step, determination is based on information that was acquired by the lens communication of step S31. If the result of this determination is that the interchangeable lens that has been attached is not a fisheye lens, or that the type of interchangeable lens is unknown, processing advances to step S41. In this case, 0 is set as the fisheye lens flag (S41).

If the result of determination in step S33 is that the lens that has been attached is a fisheye lens, next the type of fisheye lens is determined (S35). In this step also, determination is based on information that was acquired by the lens communication of step S31. As determinations of the type of fisheye lens, there are is it circular fish-eye, and is it full-frame fisheye.

If the result of determination in step S35 is circular fish-eye, 1 is set as the fisheye lens flag (S37). On the other hand, if the result of determination is full-frame fisheye, 2 is set as the fisheye lens flag (S39). Once setting of the fisheye lens flag has been performed in steps S37 to S41, the originating flow is returned to. It should be noted that since the attached lens detection processing is repeatedly performed, in the case of a fisheye zoom lens that is circular fish-eye at the wide end and full-frame fisheye at the telephoto end, the fisheye lens flag will become 1 or become 2 in accordance with focal length of the lens.

Next, live view fisheye correction processing (refer to S3 in FIG. 3) will be described using the flowchart shown in FIG. 6. If the flow for live view fisheye correction processing is commenced, first the fisheye lens flag is checked (S51). The fisheye lens flag is set in steps S37 to S41. In this step, determination is based on this fisheye lens flag that has been set.

If the result of determination in step S51 is that the fisheye lens flag=0, specifically, that the interchangeable lens that has been attached is not a fisheye lens, or if the type of lens that has been fitted is unknown, fisheye correction processing is not performed and the originating flow is returned to. Also, if the result of determination in step S51 is that the fisheye lens flag=2, specifically, that the interchangeable lens that has been attached is a full-frame fisheye lens, processing advances to determination as to whether or not to perform fisheye/wide-angle conversion processing, without performing circular fish-eye projection transformation processing and circular fish-eye/full-frame fisheye conversion processing (refer to S61).

If the result of determination in step S51 is that the fisheye lens flag=1, specifically, that the interchangeable lens that has been attached is a circular fisheye lens, next the circular fish-eye projection transformation flag is checked (S53). If the photographer converts the projection method of an image that has been formed by a circular fisheye lens, circular fish-eye projection transformation is set (refer to FIG. 22A and FIG. 22B and S153 in FIG. 27). In this step it is determined whether or not this projection transformation has been set.

If the result of determination in step S53 is that the circular fish-eye projection transformation flag=1, specifically, that circular fish-eye projection transformation will be performed, next the circular fish-eye projection transformation processing is executed (S55). In this step, the image processing section 111 executes projection transformation processing for any of orthogonal projection, equidistant projection, equisolid angle projection or solid angle projection in accordance with the projection method flag that has been set.

If circular fish-eye projection transformation processing has been performed in step S55, or if the result of determination in step S53 was that the circular fish-eye projection transformation flag was 0 (specifically that circular fish-eye projection transformation is invalid), next the circular fish-eye/full-frame fisheye conversion flag is checked (S57). If the photographer wants to convert an image that has been formed with a circular fisheye lens to an image that is equivalent to an image that has been formed with a full-frame fisheye lens, such as shown in FIG. 2B, circular fish-eye/full-frame fisheye conversion is set (refer to FIG. 23). In this step it is determined whether or not this conversion has been set.

If the result of determination in step S57 is that the circular fish-eye/full-frame fisheye conversion flag is 1, next circular fish-eye/full-frame fisheye conversion processing is executed (S59). In this step, the image processing section 111 generates an image that is the same as an image that has been generated with a full-frame fisheye lens, by trimming an image that has been formed by a circular fisheye lens (refer to FIG. 2A) so that an opposite angle of the screen is inscribed in the image circle of the circular fish-eye (refer to FIG. 2B).

If circular fish-eye/full-frame fisheye conversion processing is performed in step S59, or if the result of determination in step S57 was that the circular fish-eye/full-frame fisheye conversion flag is 0 (invalid), or if the result of determination in step S51 is that the fisheye lens flag=2 (namely that a lens that has been attached is a full-frame fisheye lens), next the fisheye/wide-angle conversion flag is checked (S61). If the photographer wants to convert not to an image that has been formed with a fisheye lens but to an image that is equivalent to having been taken with a wide-angle lens, fisheye/wide-angle conversion is set (refer to FIG. 17A, FIG. 17B and S123 in FIG. 26). In this step it is determined whether or not this conversion has been set.

If the result of determination in step S61 is that the fisheye/wide-angle conversion flag is 1 (valid), fisheye/wide-angle conversion processing is executed (S63). In this step, the image processing section 111 converts a projection method of an image that has been formed by a fisheye lens to a central projection method. Specifically, a circular fisheye image is corrected using distortion such that distortion (barrel distortion) of the circular fisheye lens is negated (for example, pin cushion distortion in the case of barrel distortion). A central part of this image that has been corrected is cropped to an image at a specified aspect ratio (refer to FIG. 16). Once the fisheye/wide-angle conversion processing has been performed the originating flow is returned to.

In this way, with the flow for live view fisheye correction processing, the image processing section 111 performs circular fish-eye projection transformation processing (S55), circular fish-eye/full-frame fisheye conversion processing (S59), and/or fisheye/wide-angle conversion processing (S63) on an image that has been acquired by the camera to which the fisheye lens has been attached. Since a live view image is displayed using this image that has been subjected to conversion processing (S15 in FIG. 3) it is possible to confirm the effects of image processing before shooting, and it is possible to perform accurate framing.

Next, attached AF region restriction processing (refer to S5 in FIG. 3) will be described using the flowchart shown in FIG. 7. If the flow for AF region restriction processing is commenced, first, similarly to step S51, the fisheye lens flag is checked (S65). The fisheye lens flag is set in steps S37 to S41 (refer to FIG. 5). In this step, determination is based on this fisheye lens flag that has been set.

If the result of determination in step S65 is that the fisheye lens flag=0, specifically, that the interchangeable lens that has been attached is not a fisheye lens, or if the type of lens that has been fitted is unknown, AF region restriction processing is not performed and the originating flow is returned to. Also, if the fisheye lens flag=2 also, namely if the interchangeable lens that has been attached is a full-frame fisheye lens, the originating flow is returned to without performing AF region restriction processing. This is because if the fisheye lens flag is 0 or 2, it will be possible to arrange AF regions and/or photometric domain anywhere on the imaging surface of the image sensor 107.

On the other hand, if the result of determination in step S65 is that the fisheye lens flag=1, namely that the interchangeable lens that has been attached is a circular fisheye lens, AF regions are restricted to within the image circle of the circular fish-eye (S67). This AF region restriction will be described using FIG. 8. An image 210 is formed by a lens that is not a circular fisheye lens. In this case, the AF regions 301 can be arranged (mapped) within almost the entire image 210. In the other hand, if a circular fisheye lens has been attached a subject image (refer to image 211) is only formed within the image circle 107b. The AF regions 302 are then restricted to within the image circle 107b of the image sensor 107. Specifically, AF regions are not set outside of the image circle 107b.

Next, AF target mode restriction processing (refer to S7 in FIG. 3) will be described using the flowchart shown in FIG. 9. If the flow for AF target mode restriction processing is commenced, first, similarly to step S51 (refer to FIG. 6), the fisheye lens flag is checked (S71). The fisheye lens flag is set in steps S37 to S41 (refer to FIG. 5). In this step, determination is based on this fisheye lens flag that has been set.

If the result of determination in step S71 is that the fisheye lens flag=0, specifically, that the interchangeable lens that has been attached is not a fisheye lens, or if the type of lens that has been fitted is unknown, AF target mode restriction processing is practically not performed and the originating flow is returned to.

On the other hand, if the result of determination in step S71 is that the fisheye lens flag=1, namely that the interchangeable lens that has been attached is a circular fisheye lens, or if the fisheye lens flag=2, namely the interchangeable lens that has been attached is a full-frame fisheye lens, next determination of focus mode is executed (S73). This camera sets either manual focus (MF) or autofocus (AF) as focus mode. MF is a mode in which the photographer adjusts focus of the photographing lens 101 by manually operating a range ring. AF is a mode for adjusting focus of the photographing lens 101 automatically using the AF processing section 113. In this step, the system control section 116 determines if MF has been set or if MF has been set. If the result of this determination is that MF has been set, there is a return to the originating flow from this flow without restriction of AF target.

If the result of determination in step S73 is that focus mode is AF, it is determined whether or not it is single target AF (S75). If AF mode has been set, it is a case where not one AF region but a plurality of AF regions are set. A case where a single AF region has been set is referred to as single target AF. The number of AF regions may be set manually by the photographer, or may be set automatically by the camera. If the result of this determination is single target AF, there is a return to the originating flow from this flow without restriction of AF target.

If the result of determination in step S75 is not single target AF, there is a change to single target AF (S77). This change processing will be described using FIG. 10A to FIG. 10D.

Figure 10A:
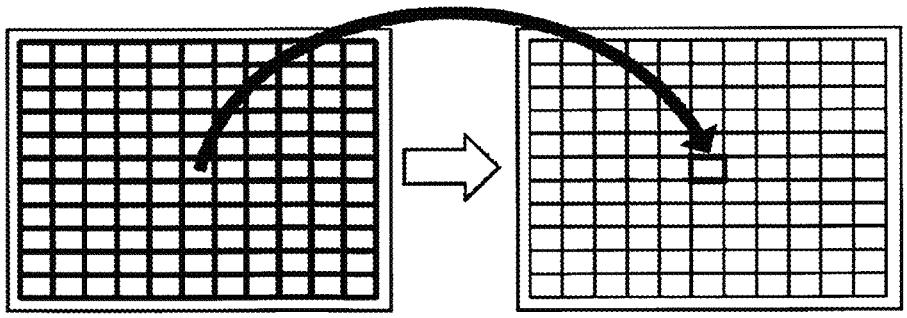
FIG. 10A to FIG. 10D are drawings for describing changing of AF target mode to single target AF, in the camera of one embodiment of the present invention.

The drawings shown on the left side of FIG. 10A show AF regions for a case where all target AF mode has been set. All target AF mode is a target mode with which it is possible to set AF regions on substantially the whole imaging surface of the image sensor 107. Rectangles (11×11 areas) in FIG. 10A are respective AF regions. With all target AF mode it is possible to focus on, for example, an AF region in which a face has been detected, among all of the AF regions. In this all target AF mode, if there is a change to single target AF mode then the AF regions are changed to a single region which is in the center of the screen, as in the drawing shown on the right side of FIG. 10A.

Figure 10B:
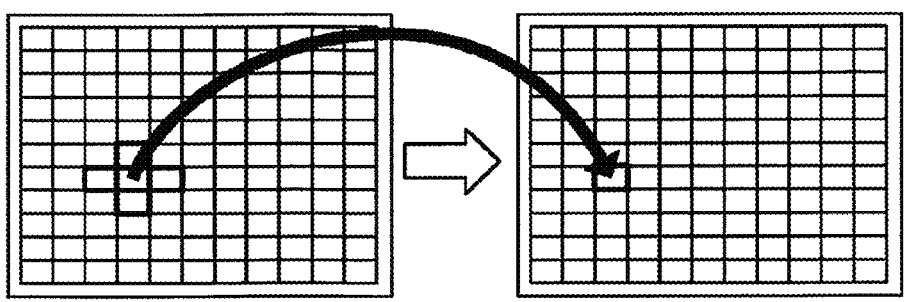
Figure 10C:
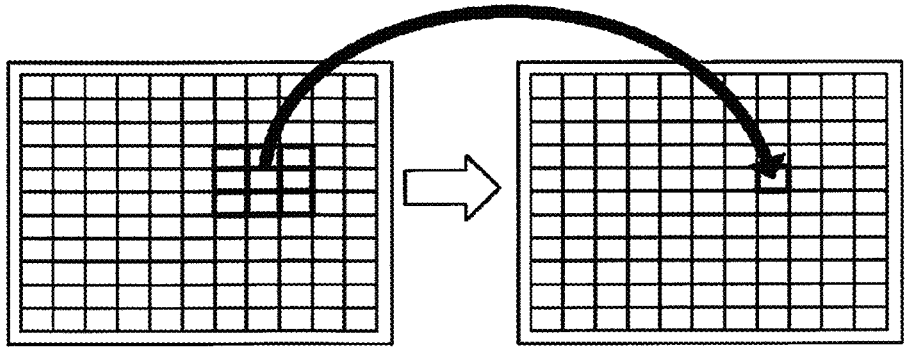
Figure 10D:
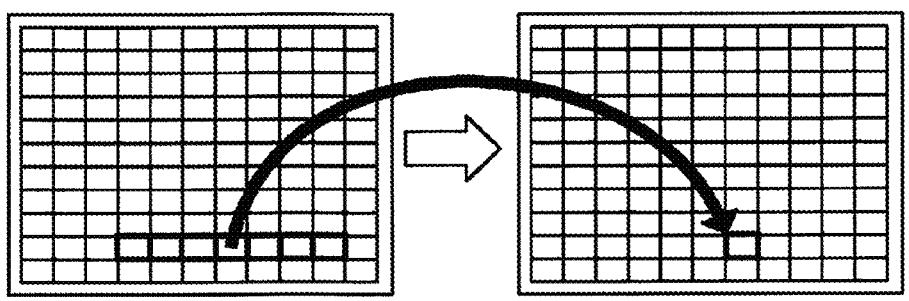

The drawings shown on the left side of FIG. 10B to FIG. 10D show AF region for a case where group target AF mode has been set. Group target AF mode is an AF target mode with which a plurality of AF regions are set. FIG. 10B is a case of five point group target AF mode, FIG. 10C is a case of nine point group target AF mode, and FIG. 10D is a case of seven point group target AF mode. In each of these cases there are a plurality of adjacent AF regions. The drawings shown on the right side of FIG. 10B to FIG. 10D show AF regions for a case where there has been a change to single target AF mode. In each of these cases there is a change to a single AF region that is in the center among the plurality of AF regions.

In step S77, if there is a change to single target AF, there is a return to the originating flow from the flow for AF target mode restriction processing. In this way, with AF target mode restriction processing, when a circular fisheye lens has been attached (S71: fisheye lens flag=1), if there is not one but a plurality of AF regions (S75: single target AF→No) there is restriction to a single AF region (S77). With this embodiment, wide AF regions are restricted to narrow AF regions by changing to AF target mode. However, it is also possible to reduce the number of AF points, or to simply restrict such as by restricting AF positions to a central part of the screen, without changing to AF target mode.

Next, AF point computational processing (refer to S9 in FIG. 3) will be described using the flowchart shown in FIG. 11. If the flow for AF point computational processing is commenced, first, similarly to step S51 (refer to FIG. 6), the fisheye lens flag is checked (S81). The fisheye lens flag is set in steps S37 to S41 (refer to FIG. 5). In this step, determination is based on this fisheye lens flag that has been set.

If the result of determination in step S71 is that the fisheye lens flag=0, specifically, that the interchangeable lens that has been attached is not a fisheye lens, or if the type of lens that has been fitted is unknown, AF point computational processing is practically not performed and the originating flow is returned to. Also, if the result of determination in step S81 is that the fisheye lens flag=2, specifically, that the interchangeable lens that has been attached is a full-frame fisheye lens, processing advances to determination as to whether or not to perform fisheye/wide-angle conversion processing (refer to S89).

If the result of determination in step S81 is that the fisheye lens flag=1, specifically, that the interchangeable lens that has been attached is a circular fisheye lens, next the circular fish-eye projection transformation flag is checked (S83). If the photographer converts the projection method of an image that has been formed by a circular fisheye lens, the circular fish-eye projection transformation flag is set to 1 (refer to FIG. 22A, FIG. 22B and S153 in FIG. 27). In this step it is determined whether or not this projection transformation has been set. If the result of this determination is that the circular fish-eye projection transformation flag is 0 (projection transformation is not performed), processing advances to determination as to whether or not to perform fisheye/wide-angle conversion processing (refer to S89).

Figure 29A:
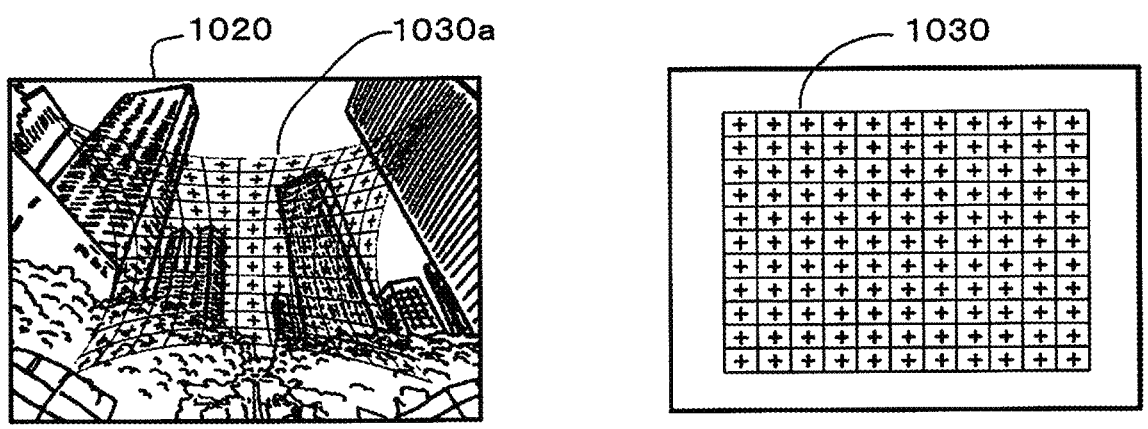
FIG. 29A and FIG. 29B are drawings for describing a relationship between position on an image sensor and position on a live view image, in a case where a fisheye lens has been attached.
Figure 29B:
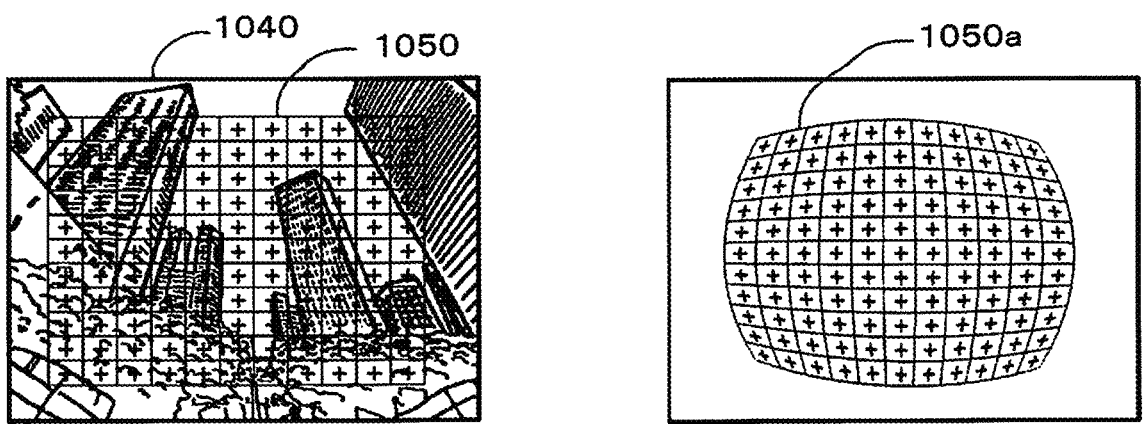

If the result of determination in step S83 is that the circular fish-eye projection transformation flag=1, namely that circular fish-eye projection transformation is performed, next position on the image sensor corresponding to barycentric position of an AF region for single target AF on live view is calculated (S85). In a case where the circular fish-eye projection transformation flag=1, projection transformation is performed in step S55 (refer to FIG. 6). If projection transformation has been performed, positions of each pixel of an image on the image sensor 107 and each pixel of an image that is subjected to live view display will be different (refer to FIG. 29A and FIG. 29B). In this step, a calculation is performed for obtaining a position on the image sensor 107 to correspond to the position of an AF region that was set in step S77 (refer to FIG. 9).

If the processing of step S85 has been performed, rectangular regions on the image sensor corresponding to area of AF regions for single target AF on live view are calculated (S87). Positions of AF regions were calculated in step S85, but in this step size of the AF regions is also calculated.

Once the processing of step S87 has been performed, next the fisheye/wide-angle conversion flag is checked (S89). If the photographer wants to convert to an image that is equivalent to having been taken with a wide-angle lens, not a fisheye lens, fisheye/wide-angle conversion is set (refer to FIG. 17A and FIG. 17B). In this step it is determined whether or not this conversion has been set. If the result of this determination is that the fisheye/wide-angle conversion flag=0, the originating flow is returned to.

If the result of determination in step S89 is that the fisheye/wide-angle conversion flag=1 (valid), then similarly to step S85, position on the image sensor corresponding to barycentric position of an AF region for single target AF on live view is calculated (S91). If the fisheye/wide-angle conversion flag=1 the fisheye/wide-angle conversion in step S63 (refer to FIG. 6) is performed. Once fisheye/wide-angle conversion has been performed, positions of each pixel of an image on the image sensor 107 and each pixel of an image that has been subjected to live view display will be different due to change in image magnification caused by strong distortion conversion and image cropping (refer to FIG. 29A and FIG. 29B). In this step, a position on the image sensor 107, corresponding to the position of an AF region that was set in step S77 (refer to FIG. 9), is calculated.

If the processing of step S91 has been performed, next, similarly to step S87, rectangular regions on the image sensor corresponding to area of AF regions for single target AF on live view are calculated (S93). Positions of AF regions were calculated in step S91, but in this step size of the AF regions is also calculated.

In this way, with the AF point computational processing, if conversion of projection method is performed for an image that was formed with a fisheye lens, barycentric position of an AF region and size of a rectangular region are corrected, taking into consideration the fact that positions of each pixel of an image on the image sensor 107 and each pixel of an image that has been subjected to live view display are different. Similarly, barycentric position of an AF region and size of a rectangular region are also corrected in a case where fisheye/wide-angle conversion processing has been performed. If an image of a circular fisheye lens or a full-frame fisheye lens has been converted by the image processing section 111, then particularly at peripheral parts of the image, positions on the image sensor 107 and positions on the live view image will be offset. This means that AF regions that have been displayed and AF regions that are actually ranged will be offset. However, with this embodiment it is possible to align AF regions that are subjected to live view display and AF regions for which focus detection is actually performed by performing the above described correction.

Next, photometric domain restriction processing (refer to S11 in FIG. 3) will be described using the flowchart shown in FIG. 12. If the flow for photometric domain restriction processing is commenced, first, similarly to step S51 (refer to FIG. 6), the fisheye lens flag is checked (S101). The fisheye lens flag is set in steps S37 to S41 (refer to FIG. 5). In this step, determination is based on this fisheye lens flag that has been set.

If the result of determination in step S101 is that the fisheye lens flag=0, specifically, that the interchangeable lens that has been attached is not a fisheye lens, or if the type of lens that has been fitted is unknown, photometric domain restriction processing is not practically performed and the originating flow is returned to. Also, if the result of determination in step S101 is that the fisheye lens flag=2, specifically, that the interchangeable lens that has been attached is a full-frame fisheye lens, processing advances to determination as to whether or not to perform fisheye/wide-angle conversion processing (refer to S111).

On the other hand, if the result of determination in step S101 is that the fisheye lens flag=1, namely that the interchangeable lens that has been attached is a circular fisheye lens, next photometric domains are restricted to within the image circle of the circular fish-eye (S103). This photometric domain restriction will be described using FIG. 13. An image 220 is formed by a lens that is not a circular fisheye lens. In this case, the photometric domains 311 can be arranged (mapped) within almost the entire image 220. On the other hand, if a circular fisheye lens has been attached a subject image (refer to image 221) is only formed within the image circle 107b. The photometric domains 312 are then restricted to within the image circle 107b of the image sensor 107. Specifically, photometric domains are not set outside of the image circle 107b.

Once restriction of photometric domains has been performed in step S103, next the circular fish-eye projection transformation flag is checked (S105). If the photographer converts the projection method of an image that has been formed by a circular fisheye lens, circular fish-eye projection transformation is set (refer to FIG. 22A, FIG. 22B and S157 to S171 in FIG. 27). In this step it is determined whether or not this projection transformation has been set. If the result of this determination is that the circular fish-eye projection transformation flag=0, namely that circular fish-eye projection transformation will not be performed, processing advances to step S111.

If the result of determination in step S105 is that the circular fish-eye projection transformation flag=1, specifically, that circular fish-eye projection transformation will be performed, next a photometric domain magnification factor is calculated from distortion conversion magnification factor of an image of a central part (S107). In a case where the circular fish-eye projection transformation flag=1, projection transformation is performed in step S55 (refer to FIG. 6). If projection transformation has been performed, positions of each pixel of an image on the image sensor 107 and each pixel of an image that is subjected to live view display will be different (refer to FIG. 29A and FIG. 29B). This means that size (width) of the photometric domains will change. In particular, a photometry function aimed at photometry for a given range on a live view screen, such as spot photometry or centrally weighted spot photometry, will be impaired. In this step, expansion magnification of the photometric domains is calculated based on type and projection method of a fisheye lens that has been attached. One example of expansion magnification of photometric domains is shown in FIG. 14A.

If expansion magnification of the photometric domains has been calculated in step S107, next a photometry rectangular region according to photometric domain magnification is calculated (S109). Expansion magnification of photometric domains is calculated in step S107. Then, photometric domains of an image after circular fish-eye projection transformation are determined by multiplying a photometric domain by the expansion magnification that has been calculated.

Next, the fisheye/wide-angle conversion flag is checked (S111). If the photographer wants to convert not to an image that has been formed with a fisheye lens but to an image that is equivalent to having been taken with a wide-angle lens, fisheye/wide-angle conversion is set (refer to FIG. 17 and FIG. 17B). In this step it is determined whether or not this conversion has been set. If the result of this determination is that the fisheye/wide-angle conversion flag=0, the originating flow is returned to.

If the result of determination in step S111 is that the fisheye/wide-angle conversion flag is 1 (valid), photometric domain magnification is calculated using crop magnification of an image of a central part, and distortion conversion magnification (S113). In a case of making an image that has been formed by a fisheye lens equivalent to an image that has been formed by wide-angle lens, a projection method is converted to a central projection method, and an image of a central part is cropped. In this step, expansion magnification for photometry amount is calculated using image cropping magnification in addition to expansion magnification that was calculated in step S107. Specifically, the expansion magnification that was shown in FIG. 14A may be further multiplied by an image cropping magnification.

If expansion magnification of the photometric domains has been calculated in step S113, next, similarly to step S109, a photometry rectangular region according to photometric domain magnification is calculated (S115). Expansion magnification of photometric domains is calculated in step S113. Then, photometric domains of an image after conversion to a wide angle image are determined by multiplying a photometric domain by the expansion magnification that has been calculated. If the rectangular region has been calculated the originating flow is returned to.

In this way, in the flow for photometric domain restriction processing, in a case where a circular fisheye lens has been attached (S101: fisheye lens flag=1), photometric domains are restricted to inside the image circle of the circular fish-eye (S103). This means that it is possible to prevent photometry position on a live view image and photometry position on an imaging surface of the image sensor 107 being different.

Also, in a case where conversion of projection method is performed for an image that was formed with a fisheye lens (refer to S105), size of a rectangular region of a photometric domain is corrected, taking into consideration the fact that positions of each pixel of an image on the image sensor 107 and each pixel of an image that has been subjected to live view display are different. Similarly, size of a rectangular region of a photometric domain is also corrected in a case where fisheye/wide-angle conversion processing has been performed (refer to S111). If an image that has been formed by a circular fisheye lens or a full-frame fisheye lens is converted by the image processing section 111, then particularly at peripheral parts of the image positions on the image sensor 107 and positions on the live view image will be offset. This means that photometric domains that have been displayed and regions where photometry is actually performed will be offset. However, with this embodiment it is possible to align photometric domains that are subjected to live view display and photometric domains for which photometry is actually performed by performing the above described correction.

Next, change of photometric domain due to projection transformation will be described using FIG. 14A to FIG. 16. As will be understood from the table shown in FIG. 14A, size of a photometric domain is changed by converting a projection method. This change is between about 0.5 and 2 times with respect to the original photometric domain. As a result it will be understood, for example, that with a method in which an image screen is divided to 18×18 and each divided region made a photometric domain, it is not possible to perform correction that is too coarse. Therefore, in order to reflect the change in size of a photometric domain due to projection transformation, the photometric domains are preferably divided as finally as possible.

Figure 15:
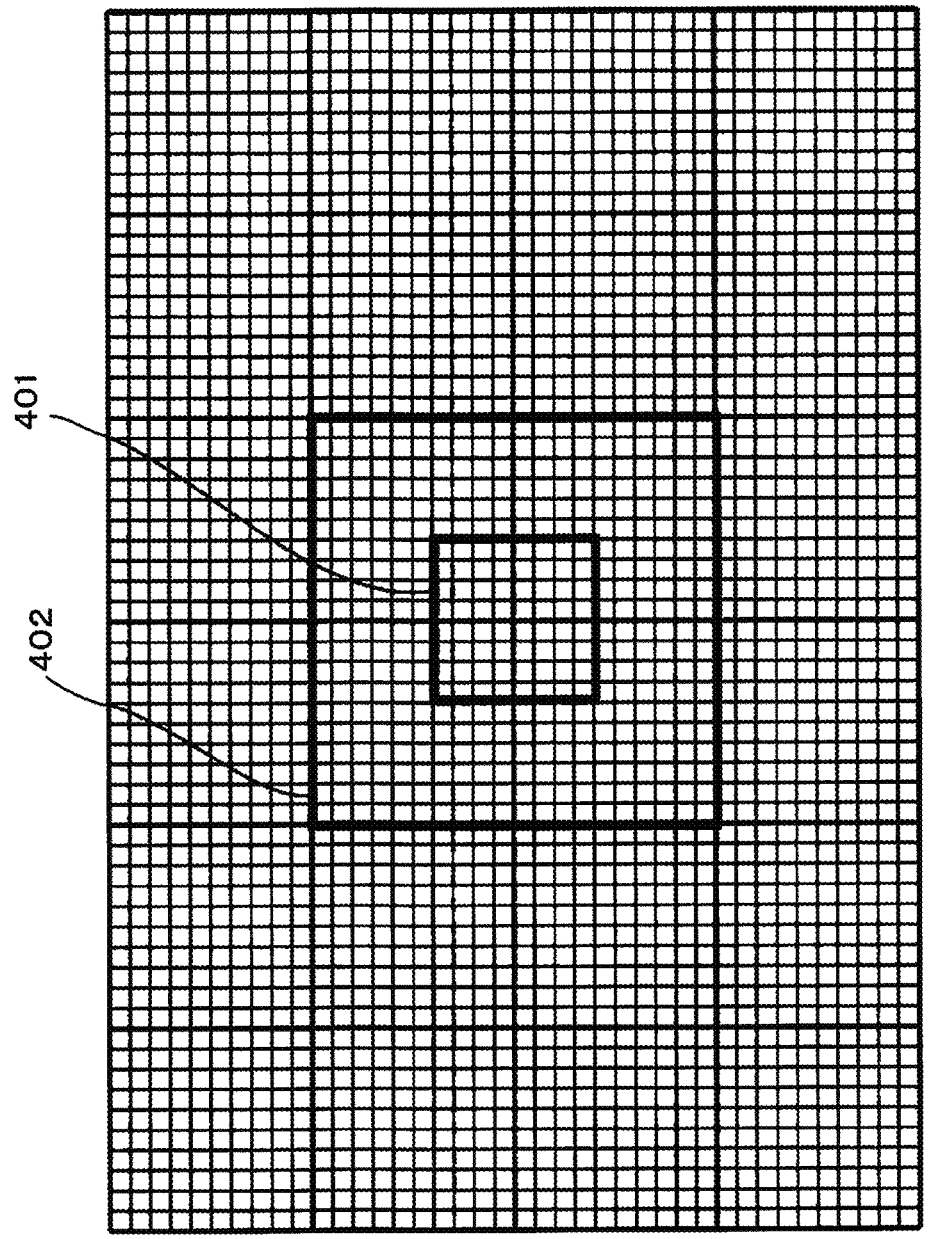
FIG. 15 is a drawing showing an example of change of photometric domain based on photometric domain expansion magnification, in the camera of one embodiment of the present invention.

Here, description will be given of an example of dividing photometric domains to 40×60. The border 401 (number of blocks is 8×8) shown in FIG. 15 is a spot photometric domain that has been marked on the image sensor 107. Also, the border 402 (number of blocks is 20×20) is a center-weighted spot photometric domain that has been mapped on the image sensor 107. It should be noted that one block contains a predetermined number of pixels. By multiplying these spot photometric domains and center-weighted spot photometric domains by the expansion magnifications for the photometric domains shown in FIG. 14A, there is a change to the photometric domain, as shown in FIG. 14B.

Figure 16:
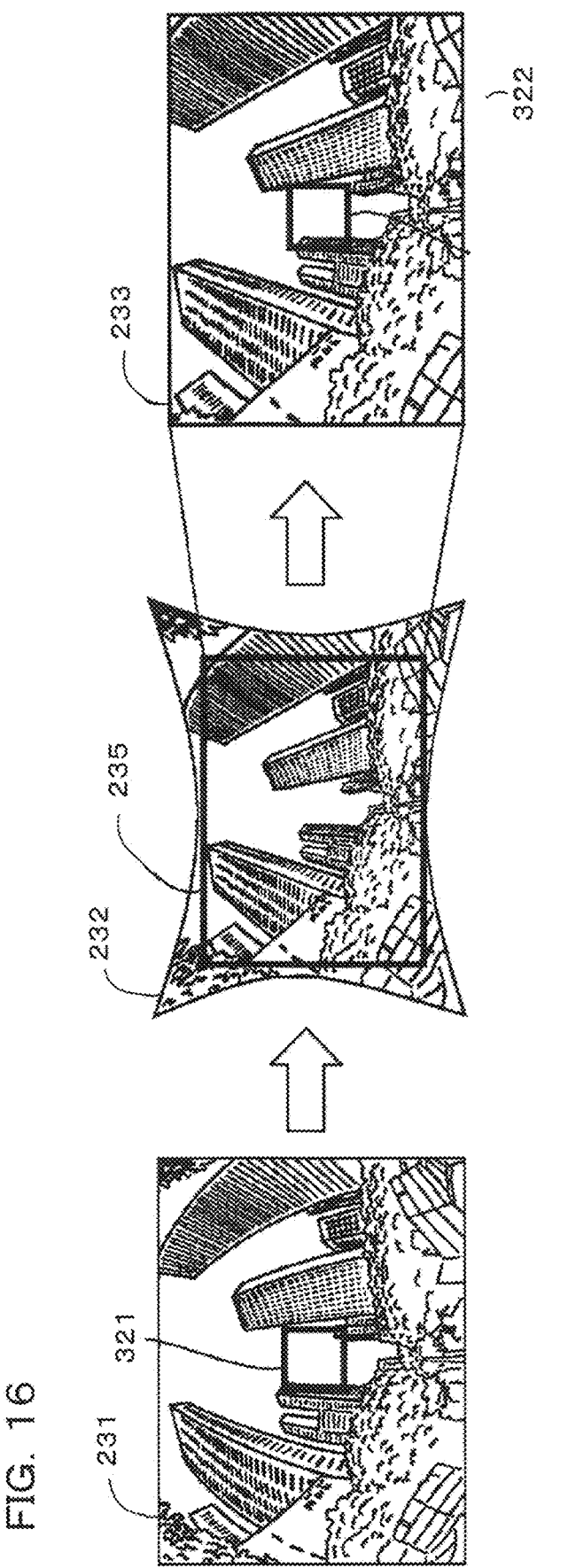
FIG. 16 is a drawing showing one example of calculating expansion magnification of a photometric domain in a case where fisheye/wide-angle conversion has been performed, in the camera of one embodiment of the present invention.

FIG. 16 shows a procedure for fisheye/wide-angle conversion processing, and calculation of expansion magnification for photometric domains when performing this conversion processing. An image 231 is an image that has been formed by a full-frame fisheye lens, and a photometric domain 321 is arranged substantially in the center of this image. A fisheye lens that has taken this image 231 has barrel distortion. The image processing section 111 therefore subjects the image 231 to image processing to create pin cushion distortion. As a result of this image processing the distortion that is characteristic of the fisheye lens is removed, and image 232 is generated. As a result of this distortion conversion there is an increase in expansion magnification of the photometric domain of 0.7 times with respect to the photometric domain.

Once the image 232 has been generated, next the image processing section 111 crops a central region 235 of the image. As a result of this cropping, the expansion magnification increases by 1.4 times in the photometric domain, resulting in the photometric domain 322. As a result of performing the fisheye/wide-angle conversion processing, there is a total expansion magnification for the photometric domain of 0.7×1.4=0.98. It should be noted that magnification when converting from the image 232 to the image 233 differs in accordance with cropping aspect ratio that is set by the photographer on a menu screen. Also, although cropping of the central portion is performed after distortion conversion with the example shown in FIG. 16, if cropping is performed before distortion conversion magnification will be different. Expansion magnification is calculated in accordance with these conditions.

Next, menu screens for fisheye correction (fisheye/wide-angle conversion) displayed on the display section 115 will be described using FIG. 17A to FIG. 20. Fisheye correction menus of this embodiment are "fisheye/wide-angle lens correction", "circular fish-eye projection method conversion", "circular fish-eye/full-frame fisheye conversion", and "circular fish-eye/aspect compatibility".

The "fisheye/wide-angle lens correction" item is the image processing section 111 performing digital distortion correction processing on an image that has been obtained using a circular fisheye lens or a full-frame fisheye lens, and trimming processing of this corrected image. As a result of this correction processing it is possible to generate an image that is equivalent to having been taken with a wide-angle lens.

Also, as subsidiary menus of the "fisheye/wide-angle lens correction", "angle of view", "underwater distortion correction connection", and "aspect ratio linked trimming" are displayed. "angle of view" can be designated from any of three types of angle of view (wide, standard, and narrow) when performing "fisheye/wide-angle lens correction". The "underwater distortion correction association" item is designating whether or not to correct differences in refractive index between in air and in water, when a waterproof lens for underwater photography has been used. The "aspect ratio linked trimming" item is designating whether or not to perform trimming by considering aspect ratio after distortion correction.

Also, "circular fish-eye projection method conversion" involves the image processing section 111 performing digital conversion processing on an image that has been acquired using a circular fisheye lens or a full-frame fisheye lens, and generating an image of another projection method. The image processing section 111 performs digital conversion processing on an image that has been acquired using a circular fisheye lens, and trims an image that has been subjected to this conversion processing. As a result of this image processing it is possible to generate an image that is equivalent to having been taken with a full-frame fisheye lens.

A menu screen for fisheye correction is displayed if the operation section 117 is operated to open a menu top screen and select a setting tab. With the examples of menu screens shown in FIG. 17A and FIG. 17B, the tab 501a that is fourth from the upper left is a setting tab.

Figure 17A:
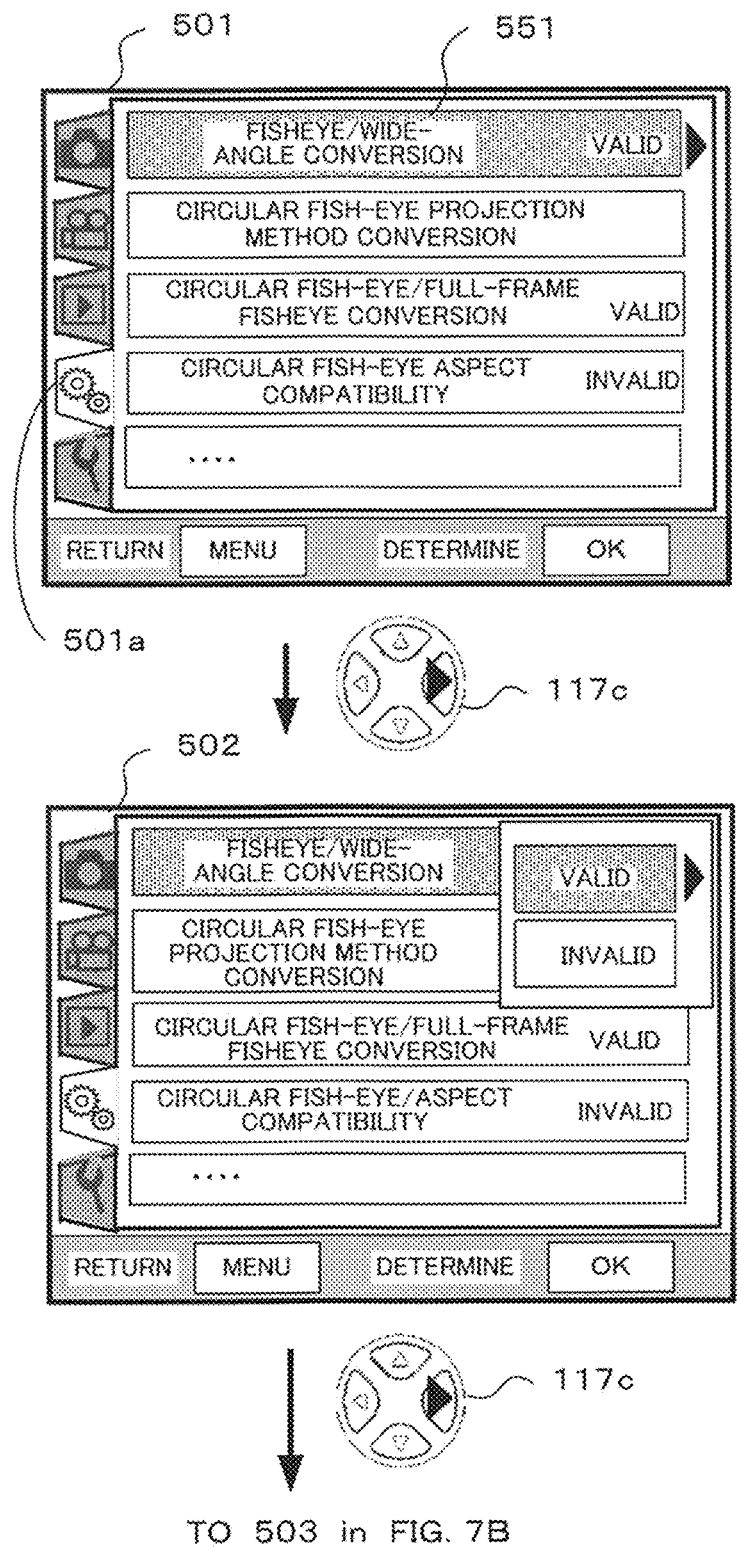

The upper left part of FIG. 17A and FIG. 17B shows a menu screen 501. The display section 115 displays this menu screen 501. Various setting items relating to fisheye correction are displayed on the menu screen 501, and as one setting item among these "fisheye/wide-angle conversion" 551 is displayed. In this state the photographer operates up and down buttons of the cross shaped button 117c and aligns the cursor with "fisheye/wide-angle conversion" 551. In this state, if the photographer operates the right side button of the cross shaped button 117c there is a change to the menu screen 502, and it is possible to designate "valid". If the OK button is operated in the state of the menu screen 502, "valid" is selected. In this state the fisheye/wide-angle conversion flag is set to 1 and execution of fisheye/wide-angle conversion processing is possible (valid) (refer to S63 in FIG. 6). It should be noted that on the menu screens 501 and 502, "valid" is displayed only when a fisheye lens is attached to the camera body.

On the menu screen 502, if the photographer operates the right side of the cross shaped button 117c again, the menu screen 503 is displayed. Three setting items are displayed on this menu screen 503, namely "wide-angle lens angle of view", "underwater distortion correction connection", and "aspect ratio linked trimming". On the menu screen 503 in FIG. 17B "wide-angle lens angle of view" is selected. If the photographer operates the up button or down button of the cross shaped button 117c in this state, the cursor is moved between "wide-angle lens angle of view", "underwater distortion correction connection", and "aspect ratio linked trimming", and it is possible to sequentially select as setting items (refer to menu screens 503, 504 and 505).

Next, selection of angles of view 1 to 3 in a case where "wide-angle lens angle of view" has been selected will be described using FIG. 18. The menu screen 503 shown in the upper part of FIG. 18 is the same as the menu screen 503 that was shown on the upper right of FIG. 17B. The "angle of view 1" item is displayed on this menu screen 503 together with "wide-angle lens angle of view". If the photographer operates the right side button of the cross shaped button 117c in this state, the menu screen 503a is displayed.

The menu screen 503a displays content of image processing for when performing fisheye/wide-angle conversion to a wide angle of view. Specifically, the name of the lens, and focal length (8 mm) and aperture value (F1.8) of that lens that an image to be converted, that has been acquired by means of communication, corresponds to, are displayed. Further, angle of view (123°) for in air and angle of view) (116°) for under water are displayed on the menu screen 503a as angles of view after conversion by diagonal conversion for aspect ratio (4:3). If the photographer operates the OK button of the operation section 117 in the state of the menu screen 503a, angle of view 1 is confirmed. Once angle of view 1 has been confirmed, the image processing section 111 converts the image that has been taken with a fisheye lens to an image that is equivalent to having been taken with a wide-angle lens displayed on the menu screen 503a.

If the photographer operates the down button of the cross shaped button 117c in the state where the menu screen 503a is being displayed, the menu screen 503b is displayed. The menu screen 503b displays content of image processing for when performing fisheye/wide-angle conversion to a standard angle of view. Specifically, the name of the lens that an image to be converted corresponds to, and focal length (8 mm) and aperture value (F1.8) of that lens, are displayed. Further, angle of view (113°) for in air and angle of view (104°) for under water are displayed on the menu screen 503b as angles of view for angle of view 2. If the photographer operates the OK button of the operation section 117, angle of view 2 (standard) is confirmed. Once angle of view 2 has been confirmed, the image processing section 111 converts the image that has been taken with a fisheye lens to an image that is equivalent to having been taken with a wide-angle lens displayed on the menu screen 503b.

If the photographer operates the down button of the cross shaped button 117c in the state where the menu screen 503b is being displayed, the menu screen 503c is displayed. The menu screen 503c displays content of image processing for when performing fisheye/wide-angle conversion to a narrow angle of view. Specifically, the name of the lens that an image to be converted corresponds to, and focal length (8 mm) and aperture value (F1.8) of that lens, are displayed. Further, angle of view (100°) for in air and angle of view (89°) for underwater are displayed on the menu screen 503c as angles of view for angle of view 3. If the photographer operates the OK button of the operation section 117, angle of view 3 (narrow) is confirmed. Once angle of view 3 has been confirmed, the image processing section 111 converts the image that has been taken with a fisheye lens to an image that is equivalent to having been taken with a wide-angle lens that is displayed on the menu screen 503c.

In each of the states of the menu screens 503a, 503b and 503c, it is possible to cyclically switch the above-described three menu screens by operating the down button or the up button of the cross shaped button 117c. Also, in the states of the menu screens 503a, 503b, and 503c, by operating the right button or the left button of the cross shaped button 117c it is possible to return to the menu screen 503 or switch to the menu screens 503a, 503b and 503c. It should be noted that with this embodiment there are three types of angle of view. However, this is not limiting and then may be four or more types of angle of view, or there may be one, or two angles of view. Also, angular values for the respective angle of view 1, angle of view 2, and angle of view 3 may be changed and displayed each time in accordance with the type of fisheye lens that is attached.

Selection of "underwater distortion correction connection" in a case where "fisheye/wide-angle conversion" is selected will be described using FIG. 19. The menu screen 504 shown on the left side of FIG. 19 is the same as the menu screen 504 that was shown on the right side in the middle of FIG. 17B. The "perform" item is displayed on this menu screen 504 together with "underwater distortion correction association". If the photographer operates the right side button of the cross shaped button 117c in this state, the menu screen 504a is displayed. By operating the up button or the down button of the cross shaped button 117c in this state, it is possible to switch between "perform" and "do not perform". If the photographer operates the OK button in a state where "perform" is being displayed on the menu screen 504a, underwater distortion correction connection is confirmed. If confirmation is performed, it is possible to correct the effects of distortion in water when shooting underwater in a state where a waterproof lens port has been attached.

Selection of "aspect ratio linked trimming" in a case where "fisheye/wide-angle conversion" is selected will be described using FIG. 20. The menu screen 505 shown on the left side of FIG. 20 is the same as the menu screen 505 that was shown on the right side in lower part of FIG. 17B. The "perform" item is displayed on this menu screen 505 together with "aspect ratio linked trimming". If the photographer operates the right side button of the cross shaped button 117c in this state, the menu screen 505a is displayed. By operating the up button or the down button of the cross shaped button 117c in this state, it is possible to switch between "perform" and "do not perform". If the photographer operates the OK button in a state where "perform" is being displayed on the menu screen 505a, aspect ratio linked trimming is confirmed.

Aspect ratio linked trimming will be described using FIG. 21A and FIG. 21B. Whether or not to perform aspect ratio linked trimming is selected on the menu screens 505 and 505a shown in FIG. 20. In both FIG. 21A and FIG. 21B an example is shown of generating a distortion corrected image having an aspect ratio of 16:9, using a full-frame fisheye image having an aspect ratio of 4:3. FIG. 21A shows image processing for a case where "do not perform" aspect ratio linked trimming has been selected, while FIG. 21b shows image processing for a case where "perform" aspect ratio linked trimming has been selected.

First, the case where aspect ratio linked trimming is not performed will be described. A fisheye image 601 is a full-frame fisheye image having an aspect ratio of 4:3. An image 602 is an image in which fisheye/wide-angle conversion (distortion correction) has been performed. Similarly to the description for FIG. 16, this distortion correction is the image processing section 111 applying image processing for distortion so as to counteract barrel distortion that the fisheye image has.

If the image 602 is generated, next the image processing section 111 crops a distortion corrected image 603 of a maximum size of 4:3 from a region having image data in a central part of the image, with trimming frame 602a. Aspect ratio of an image 603 that is cropped by this trimming frame 602a is the same as the aspect ratio of the initial image 601.

Next, the image processing section 111 generates a distortion corrected image 604 having an aspect ratio of 16:9 using the image 603. Specifically, only an image remains inside the trimming frame 603a, and outside the trimming frame is filled black.

In this way, in the case of "do not perform" aspect ratio linked trimming, distortion correction is performed at the same aspect ratio as for the original fisheye image 601 (refer to image 602). After this distortion correction has been performed, a distortion corrected image 603 is generated with the same aspect ratio (4:3). Once this distortion corrected image 603 has been generated, next a distortion corrected image is generated with a target trimming frame (16:9) (refer to the distortion corrected image 604).

Next, the case where aspect ratio linked trimming is performed will be described. A fisheye image 601 is a full-frame fisheye image having an aspect ratio of 4:3. Performing distortion correction for this fisheye image 601 and generating image 602 is the same as for the case of not performing aspect ratio linked trimming. Image processing after this is different. In the case of not performing aspect ratio linked trimming, cropping was performed with a trimming frame of 4:3, and a distortion corrected image 603 of 4:3 was generated. However, in the case of performing aspect ratio linked trimming, the image processing section 111 directly performs cropping of the image 602 using a trimming frame 612a of 16:9. This image that has been cropped is a distortion corrected image 614 of 16:9.

In the case of "performing" aspect ratio linked trimming, since cropping is performed directly on an image after distortion correction with an aspect frame of a final aspect, it is possible to crop a wider image 614 compared to the image 604.

Figure 22A:
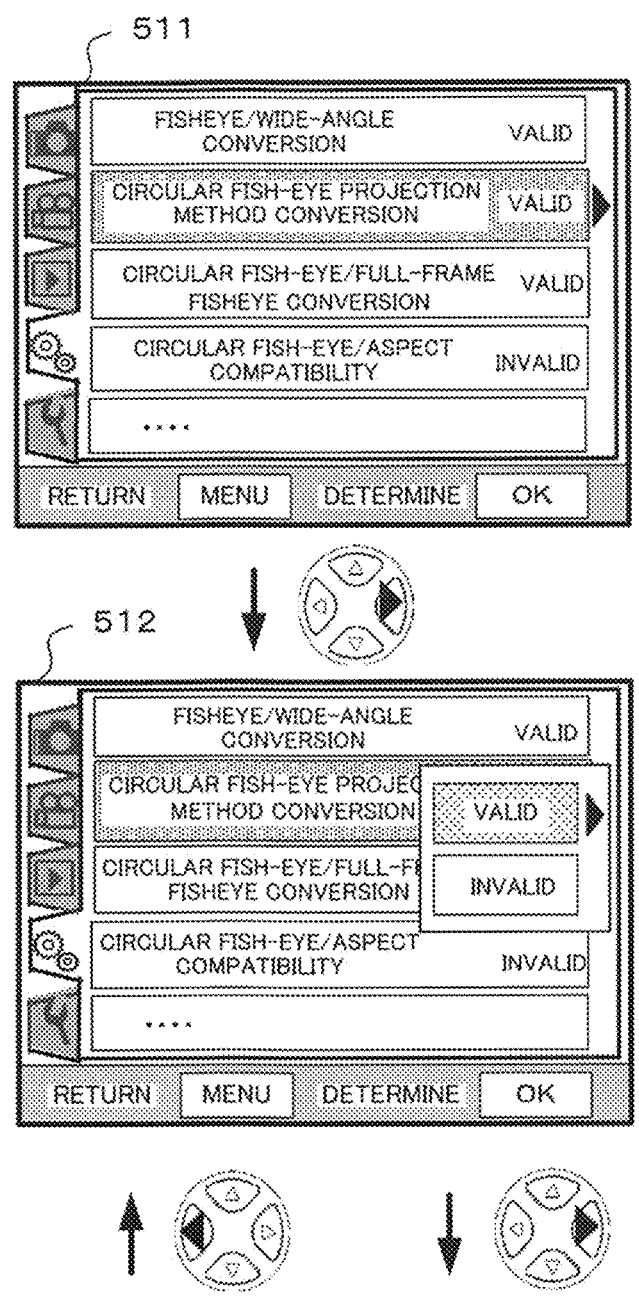
FIG. 22A and FIG. 22B are drawings showing examples of menu display in a case of performing circular fish-eye projection method conversion, in the camera of one embodiment of the present invention.
Figure 22B:
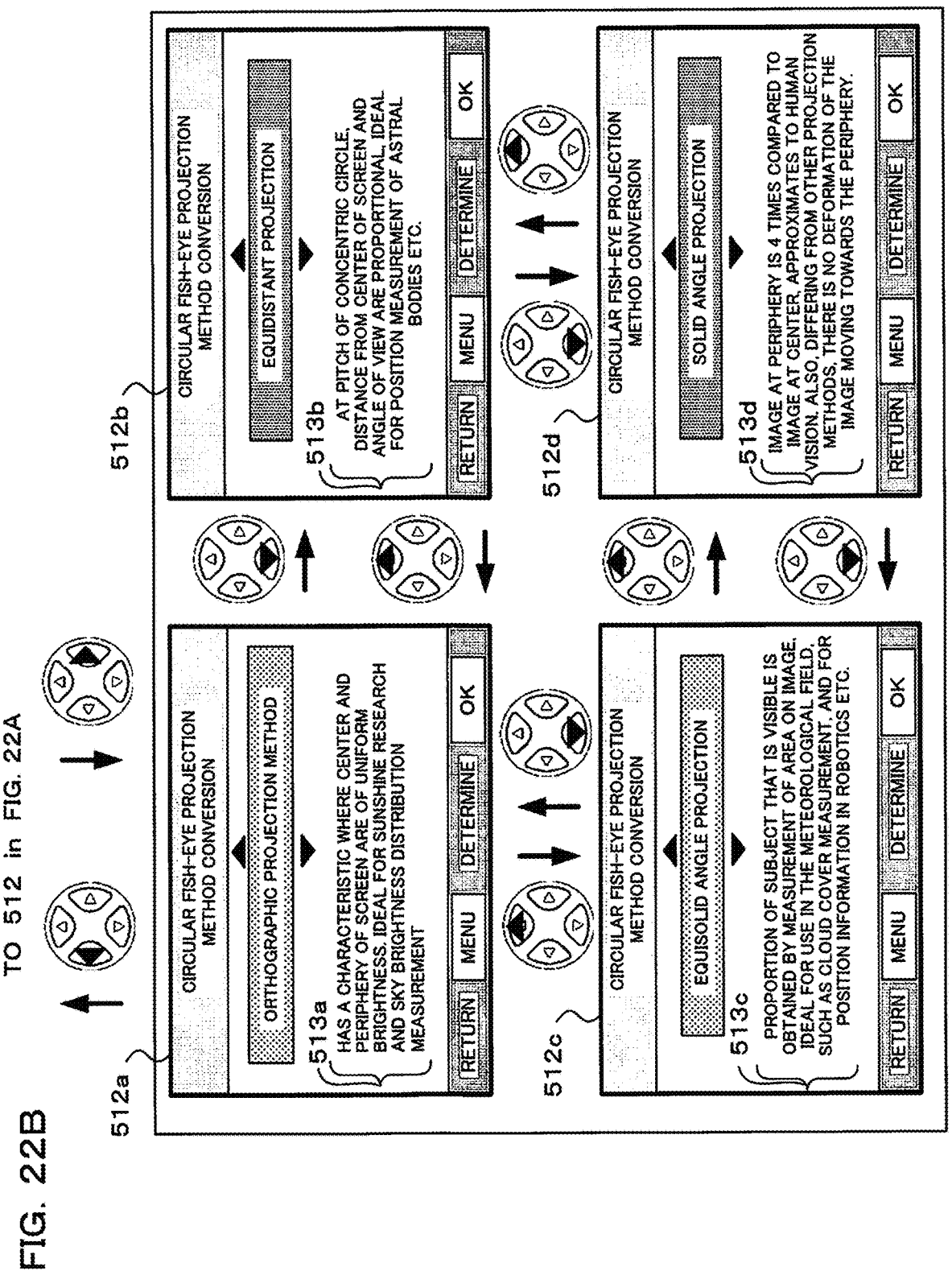

Next, a menu screen for circular fish-eye projection method conversion will be described using FIG. 22A and FIG. 22B. On the menu screen 501 (refer to FIG. 17A), if the photographer operates the down button of the cross shaped button 117c there is a change to the menu screen 511 shown in FIG. 22A. In this state, if the photographer operates the right side button of the cross shaped button 117c there is a change to the menu screen 512, and it is possible to designate "valid". If the photographer operates OK in this state, "valid" is selected and it is possible to execute circular fish-eye projection transformation processing (refer to S55 in FIG. 6). It should be noted that "valid" is only displayed in a case where a circular fisheye lens is attached to the camera body.

If circular fish-eye projection method conversion becomes valid, next, the photographer sequentially displays menus screens 512a, 512b, 512c and 512d for selection of projection method by operating the right button of the cross shaped button 117c.

The menu screen 512a is a screen for selecting an orthographic system. Description 513a for the orthographic system is displayed on this screen. In the event that the photographer selects orthographic system, an OK button that has been displayed on this screen may be operated. The menu screen 512b is a screen for selecting an equidistance projection method. Description 513b for the equidistance projection method is displayed on this screen. In the event that the photographer selects equidistance projection method, an OK button that has been displayed on this screen may be operated.

The menu screen 512 is a screen for selecting an equisolid angle projection method. Description 513c for the equisolid angle projection method is displayed on this screen. In the event that the photographer selects equisolid angle projection method, an OK button that has been displayed on this screen may be operated. The menu screen 512d is a screen for selecting a solid angle projection method. Description 513d for the solid projection method is displayed on this screen. In the event that the photographer selects solid angle projection method, an OK button that has been displayed on this screen may be operated.

Next, a menu screen for circular fish-eye/full-frame fish-eye conversion will be described using FIG. 23. On the menu screen 511 (refer to FIG. 22A), if the photographer operates the down button of the cross shaped button 117c there is a change to the menu screen 521 shown in FIG. 23. In this state, if the photographer operates the right side button of the cross shaped button 117c there is a change to the menu screen 522, and it is possible to designate "valid". If the photographer operates OK in this state, "valid" is selected and it is possible to execute circular fish-eye/full-frame fisheye conversion processing (refer to S59 in FIG. 6, and FIG. 16). It should be noted that "valid" is only displayed in a case where a circular fisheye lens is attached to the camera body.

If circular fish-eye/full-frame fisheye conversion is set to "valid" on the menu screen 522 and the photographer operates the right button of the cross shaped button 117c, there is a change to the menu screen 523. The "aspect ratio linked trimming" item is displayed on the menu screen 523. Further, if the photographer operates the right button of the cross shaped button 117c there is a change to the menu screen 524, and it is possible to select to "perform" or "not perform" aspect ratio linked trimming.

Figure 24A:
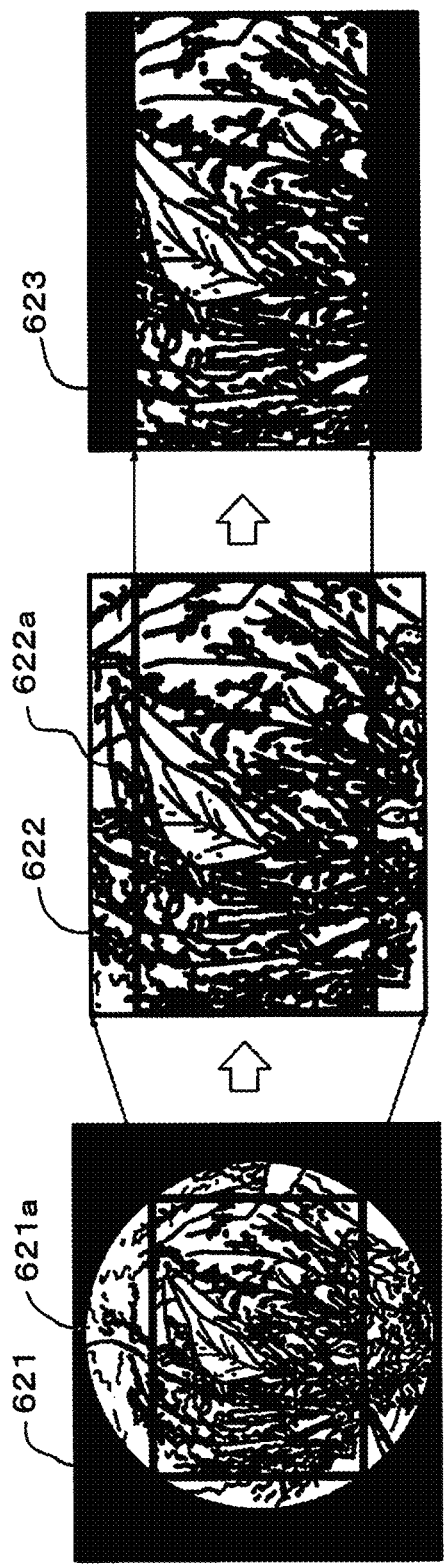
FIG. 24A and FIG. 24B are drawings showing one example of image processing, in a case of performing aspect compatibility trimming processing, in the camera of one embodiment of the present invention.
Figure 24B:
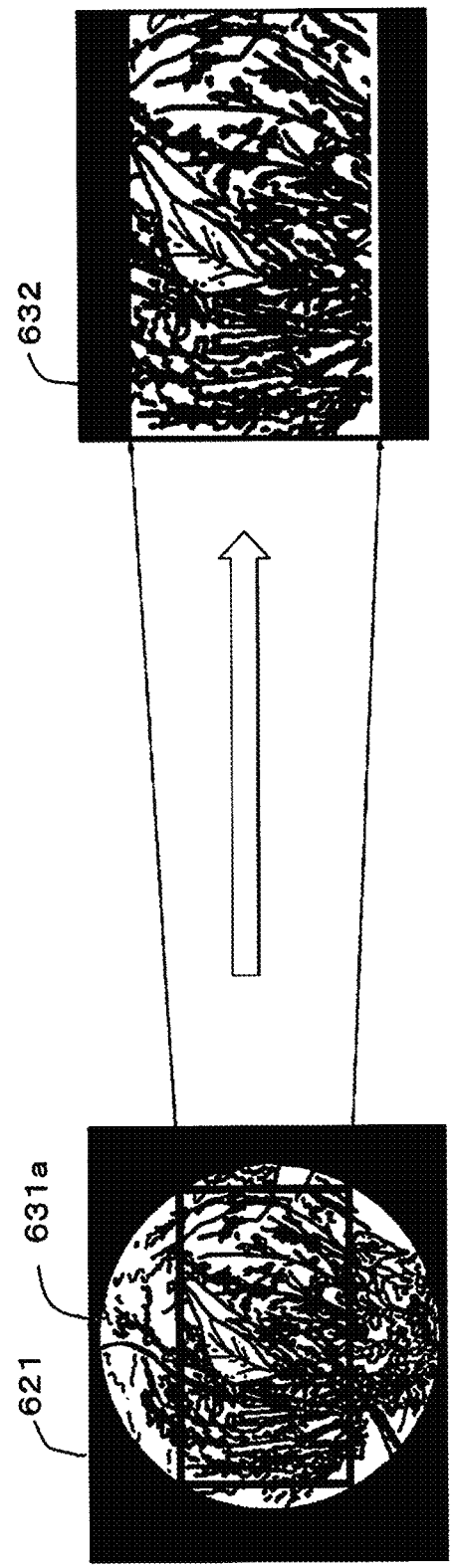

Next, aspect ratio linked trimming for circular fish-eye/full-frame fisheye conversion will be described using FIG. 24A and FIG. 24B. FIG. 21A and FIG. 21B that were described previously showed a case where aspect ratio linked trimming was performed on a full-frame fisheye image. In contrast, FIG. 24A and FIG. 24B show a case where aspect ratio linked trimming is performed on a circular fish-eye image.

Figure 23:
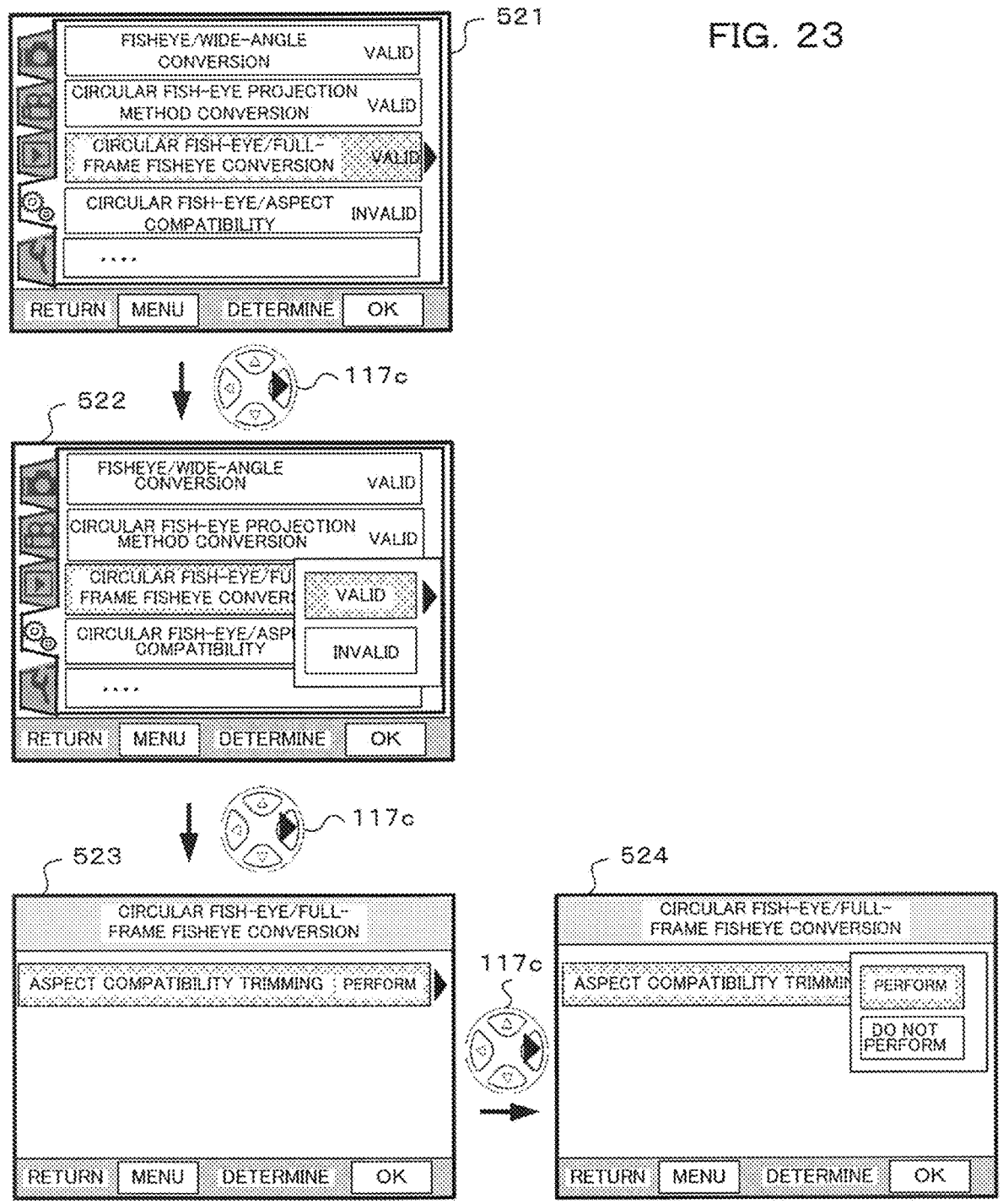
FIG. 23 is a drawing showing examples of menu display in a case of performing circular fish-eye projection method conversion, in the camera of one embodiment of the present invention.

Whether or not to perform aspect ratio linked trimming on the circular fish-eye image is selected on the menu screens 523 and 524 shown in FIG. 23. In both FIG. 24A and FIG. 24B an example is shown of generating an image having an aspect ratio changed to 16:9, using a circular fish-eye image having an aspect ratio of 4:3. FIG. 24A shows image processing for a case where "do not perform" aspect ratio linked trimming has been selected, while FIG. 24B shows image processing for a case where "perform" aspect ratio linked trimming has been selected.

First, the case where aspect ratio linked trimming is not performed will be described. A circular fish-eye image 621 is a circular fish-eye image having an aspect ratio of 4:3. An image 622 is an image resulting from converting a circular fish-eye image to a full-frame fisheye image. This image 622 that has been made into a full-frame fisheye image is an image resulting from having cropped an image of trimming frame 621a in the middle of the circular fish-eye image 621. The trimming frame 621a has a trimming ratio of 4:3.

If the image 622 has been generated, next the image processing section 111 crops the full-frame fisheye image 603 using the trimming frame 622a, that contains a central region of the image. Aspect ratio of this trimming frame 622a is 16:9. Accordingly, a 16:9 full-frame fisheye image 623 is generated from the 4:3 circular fish-eye image 621.

In this way, in the case of "not performing" aspect ratio linked trimming, a full-frame fisheye image 622 having the same aspect ratio as the original circular fish-eye image 621 is generated, image cropping is performed from this full-frame fisheye image 622 at a target aspect ratio (16:9), and the aspect ratio of the image is changed.

Next, the case where aspect ratio linked trimming is performed will be described. A circular fish-eye image 621 has an aspect ratio of 4:3, similarly to FIG. 24A. A full-frame fisheye image 632 is cropped from this circular fish-eye image 621 with the trimming frame 631a. Aspect ratio of this trimming frame 631a is 16:9.

In this way, in the case of "performing" aspect ratio linked trimming, an image is cropped with a target trimming frame 631a from the original circular fish-eye image 621, and the full-frame fisheye image 632 is generated. This means that in the case of performing aspect ratio linked trimming, as well as an image being generated only once, it is possible to obtain a wider angle image 632 compared to the image 623.

Next, a menu screen for circular fish-eye/aspect compatibility will be described using FIG. 25. On the menu screen 521 (refer to FIG. 23), if the photographer further operates the down button of the cross shaped button 117c there is a change to the menu screen 531 shown in FIG. 25. In this state, if the photographer operates the right side button of the cross shaped button 117c there is a change to the menu screen 532, and it is possible to designate "valid". If the photographer operates OK in this state, "valid" is selected and it is possible to execute circular fish-eye/aspect compatibility processing. It should be noted that "valid" is only displayed in a case where a circular fisheye lens is attached to the camera body.

In FIG. 25, in the case where circular fish-eye/aspect compatibility is "invalid", if aspect ratio is changed from the original aspect ratio of 4:3 ends of the circular fish-eye will be cut, excluding the aspect ratio of 1:1. In the case of a movie an aspect ratio of 16:9 is mainstream, and in the case of still pictures aspect ratios of 3:2 and 4:3 are mainstream. In this way, in the case of "invalid" it is not possible to acquire circular fish-eye images at the mainstream aspect ratios for movie or still picture shooting. In the case of "valid" a circular fish-eye image is generated in accordance with each aspect ratio. On display, in a case where a lens that has been fitted is circular fish-eye, an image is subjected to live view display scaled down in accordance with aspect ratio. At this time, AF regions and photometric domains are also displayed similarly scaled down. Specific decreased magnifications are uniquely determined as "3:2" being a factor of 8/9 and "16:9" being a factor of 3/4, for aspect ratio "4:3" of the original circular fish-eye.

On the menu screen 532 if circular fish-eye/aspect compatibility has been set to "valid" and the photographer operates the right button of the cross shaped button 117c, there is a change to the menu screen 533, and subordinate menus for circular fish-eye/aspect compatibility is displayed. The menu screen 533 displays background image, background image magnification, background image inversion and background image blurring intensity as subordinate menus. These subordinate menus are changed to images such as have been taken by a so-called soratama or "crystal ball lens". A soratama or crystal ball lens displays an image that has been taken with a circular fisheye lens in the center of an image, and also an image resulting from converting a circular fish-eye image to full-frame fisheye image or having performed wide angle conversion is displayed outside this circular fish-eye image.

The "background image—black back" menu screen 533 is setting to make the outside of the circular fish-eye image only black. Since there is no light outside the circular fish-eye and it becomes black, with normal shooting for circular fish-eye the background becomes "black". Instead of this "black background", it is possible to select an arbitrary background, such as "white background", "grey background", "yellow background", "blue background" etc., using image processing. It is also possible, instead of only a single color, to crop "transparent (a channel)" or an image of a center part of circular fish-eye, as a background image.

The "background image magnification" item displayed on the menu screen 533 is setting of cropping magnification for a background image. If this "background image magnification" is selected, it is possible to change the magnification. The "background image inversion" item is used to select "flip horizontally", "flip vertically", "rotate 180°", or "no inversion" for a background image that has been cropped. "background image blurring intensity" selects intensity of blurring of the background image. If this "background image blurring intensity" is selected, it is possible to change blurring intensity.

Next, operation of fisheye/wide-angle change menu processing will be described using the flowchart shown in FIG. 26. This flow displays menu screens for the fisheye/wide-angle conversion that was described using FIG. 17A to FIG.

20 that were described previously, and sets each mode. This flow is realized by the CPU within the control section 116 of the camera 100 executing programs that have been stored in memory.

As was described previously, if a menu button of the operation section 117 is operated and a setting tab 501a is selected, the menu screen 501 is displayed (refer to FIG. 17A). In this state, the photographer sets content of each item by moving the cursor to each setting item by operating the cross shaped button 117. Item content is selected and confirmed with the OK button. Once setting is confirmed, a setting condition flag corresponding to the item content is set. It is first determined whether or not fisheye/wide-angle conversion is invalid or valid (S121). As was described previously, if the cursor is moved to fisheye/wide-angle conversion then "valid" and "invalid" are displayed, as shown on the menu screen 502. If the photographer operates the cross shaped button 117c in this state, either valid or invalid is selected and confirmed with the OK button.

If the result of determination in step S121 is "invalid", then the fisheye/wide-angle conversion flag is set to 0 (S125). On the other hand, if the result of determination in step S121 is "valid", then the fisheye/wide-angle conversion flag is set to 1 (S123).

If the fisheye/wide-angle conversion flag has been set to 1 or 0 in step S123 or S125, next, setting state of the wide-angle lens angle of view selection menu is determined, and a setting condition flag is set in accordance with the item content (S127). If the photographer operates the right button of the cross shaped button 117c in the state of menu screen 502, there is a change to menu screen 503. On this screen, it is possible to select angle of view of a wide-angle lens by operating the left and right buttons of the cross shaped button 117 (refer to FIG. 18).

If the result of determination in step S127 is that angle of view 1 has been selected, the wide angle of view flag is set to 1 (S129). Also, if the result of determination in step S127 is that angle of view 2 has been selected, the wide angle of view flag is set to 2 (S131). If the result of determination in step S127 is that angle of view 3 has been selected, the wide angle of view flag is set to 3 (S133). The image processing section 111 converts to an image that is the same as having been taken by a wide-angle lens having an angle of view corresponding to the flag that has been set (refer to S63 in FIG. 6).

If setting of the wide angle of view flag has been performed in steps S129 to S133, next underwater distortion correction connection is determined (S135). On the menu screen 504 (refer to FIG. 19), if the photographer moves the cursor to "underwater distortion correction connection" then "perform" and "do not perform" underwater distortion correction connection are displayed, as shown on the menu screen 504a. The photographer selects either perform or do not perform using the cross shaped button 117c, and confirms with the OK button. In this step it is determined which of "perform" and "do not perform" has been confirmed.

If the result of determination in step S135 is to perform underwater distortion correction connection, the underwater correction flag is set to 1 (S137). On the other hand, if the result of determination in step S135 is to not perform underwater distortion correction connection, the underwater correction flag is set to 0 (S139).

If the underwater correction flag has been set in step S137 or S139, next aspect ratio linked trimming is determined (S141). On the menu screen 505 (refer to FIG. 20), if the photographer moves the cursor to "aspect ratio linked trimming" then "perform" and "do not perform" aspect ratio linked trimming are displayed, as shown on the menu screen 505a. The photographer selects either perform or do not perform using the cross shaped button 117c, and confirms with the OK button. In this step it is determined which of "perform" and "do not perform" has been confirmed.

If the result of determination in step S141 is to perform aspect ratio linked trimming, the aspect ratio linked trimming flag is set to 1 (S143). On the other hand, if the result of determination in step S141 is to not perform aspect ratio linked trimming, the aspect ratio linked trimming flag is set to 0 (S145). If the image processing section 111 has set the aspect ratio linked trimming flag to 1, direct trimming at a target aspect ratio is performed from a fisheye image (refer to FIG. 21A and FIG. 21B).

If the aspect compatibility flag has been set in step S143 or S145, the flow for fisheye/wide-angle conversion menu processing is terminated.

Next, operation of "circular fish-eye projection method conversion menu processing will be described using the flowchart shown in FIG. 27. This flow displays menu screens for the "circular fish-eye projection method conversion that was described using FIG. 22A and FIG. 22B that was described previously, and sets each mode. This flow is realized by the CPU within the control section 116 of the camera 100 executing in accordance with programs that have been stored in memory.

As was described previously, if a menu button of the operation section 117 is operated and a setting tab 501a is selected, the menu screen 501 is displayed (refer to FIG. 17A). In this state, the photographer sets content of each item by moving to each setting item by operating the cross shaped button 117. Item content is selected and confirmed with the OK button. Once setting is confirmed, a setting condition flag corresponding to the item content is set. It is first determined whether or not circular fish-eye projection transformation is invalid or valid (S151). As was described previously, if the cursor is moved to circular fish-eye projection transformation then "valid" and "invalid" are displayed as shown on the menu screen 512. If the photographer operates the cross shaped button 117c in this state, either valid or invalid is selected and confirmed with the OK button.

If the result of determination in step S151 is "valid", the circular fish-eye projection method flag is set to 1 (S153). On the other hand, if the result of determination in step S151 is "invalid", the circular fish-eye projection method flag is set to 0 (S155).

If the circular fish-eye projection method flag has been set to 1 or 0 in step S153 or S155, it is next determined whether or not an orthographic system has been selected (S157). If the photographer operates the OK button on the menu screen 512a on which orthographic system is displayed (refer to FIG. 22B), orthographic system is selected.

If the result of determination in step S157 is that orthographic system has been selected, the projection method flag is set to 1 (S159).

If the projection method flag has been set to 1 in step S159, or if the result of determination in step S157 is that orthographic system has not been selected, it is next determined whether or not equidistance projection method has been selected (S161). If the photographer operates the OK button on the menu screen 512b on which equidistance projection method is displayed (refer to FIG. 22B), equidistance projection method is selected.

If the result of determination in step S161 is that equidistance projection method has been selected, the projection method flag is set to 2 (S163).

If the projection method flag has been set to 2 in step S163, or if the result of determination in step S161 is that equidistance projection method has not been selected, it is next determined whether or not equisolid angle projection method has been selected (S165). If the photographer operates the OK button on the menu screen 512c displaying equisolid angle projection method (refer to FIG. 22B), equisolid angle projection method is selected.

If the result of determination in step S165 is that equisolid angle projection method has been selected, the projection method flag is set to 3 (S167).

If the projection method flag has been set to 3 in step S167, or if the result of determination in step S165 is that equisolid angle projection method has not been selected, it is next determined whether or not a solid angle projection method has been selected (S169). If the photographer operates the OK button on the menu screen 512d displaying solid angle projection method (refer to FIG. 22B), solid angle projection method is selected.

If the result of determination in step S169 is that solid angle projection method has been selected, the projection method flag is set to 4 (S171).

If the projection method flag has been set to 3 in step S171, or if the result of determination in step S169 was that solid angle projection method was not selected, the circular fish-eye projection method conversion menu processing is terminated. The image processing section 111 converts to a projection method for a circular fish-eye image in accordance with the projection method flag that has been set (refer to S55 in FIG. 6).

As has been described above, with the one embodiment of the present invention, a fisheye lens can be attached to a main body, photometric domains and/or AF region are arranged on an image sensor, and it is possible to take digital images. Lens information is then acquired by performing communication with the lens that has been attached (for example, S31 in FIG. 5), whether or not a lens that has been attached is a circular fisheye lens is detected based on this lens information (for example, S35, S37 in FIG. 5), and if it is determined that a lens that has been attached is a circular fisheye lens photometric domains and/or AF regions are restricted based on the image circle of the circular fisheye lens (for example, S67 in FIG. 7 and S103 in FIG. 12). As a result, in case where a circular fisheye lens has been attached, AF regions and/or photometric domains are set within a range in which a subject is displayed, and the photographer does not feel any discomfort when using the lens.

Also, with the one embodiment of the present invention, an image of an imaging range of a fisheye lens is corrected (for example S63 in FIG. 6), an image after correction is displayed on a display section as a live view image (for example S15 in FIG. 3), and if an image has been corrected, positions or areas on a display section are calculated for the photometric domains and/or AF regions (for example, S91 and S93 in FIG. 11, and S113 and S115 in FIG. 12). Also, coordinates of AF regions on live view are converted to coordinates of AF regions on the image sensor (S91 in FIG. 11). As a result it is possible to set AF regions and/or photometric domains at correct positions and areas, even if an image from a fisheye lens has been corrected.

Also, with the one embodiment of the present invention, in a case where a circular fisheye lens has been attached, setting of AF regions and/or photometric domains outside the image circle is prohibited (S67 in FIG. 7, and S101 in FIG. 12). This means that it is possible to avoid unnecessary AF and photometry operations that are prone to being detrimental, and it is possible to improve speed, precision and stability of AF (photometry).

Also, it becomes impossible to perform precise AF and photometry due to peripheral distortion at the periphery of a fisheye lens. With the one embodiment of the present invention therefore, there is restriction to an optimum AF target mode and photometry mode. This means that detrimental AF and photometry operations are avoided for any type of distortion correction, and it is possible to improve speed, precision, and stability of AF (photometry).

Also, with the one embodiment of the present invention, in the case of displaying live view where distortion correction has been performed, AF is performed in a specified area of a position on an imaging surface corresponding to the center of an AF target frame that is displayed superimposed on a live view image. Similarly, for photometric domains also, positions on a shooting image plane and positions on a live view image are made to be the same. This means that detrimental AF and photometry operations are avoided for any type of distortion correction, and it is possible to improve speed, precision, and stability of AF (photometry).

It should be noted that with the one embodiment of the present invention, processing has been performed for both AF regions and photometric domains. However, processing may only be performed for one of either AF regions or photometric domains. Also, as a fisheye lens, processing has been performed for both types of fisheye lens, namely a circular fisheye lens and a full-frame fisheye lens. However, implementation may be for only a circular fisheye lens, and implementation for a full-frame fisheye lens may be omitted. Also, with the one embodiment of the present invention, menu screen setting input has been performed by operating the cross shaped button 117c and an OK button, but a touch panel may also be provided and setting input performed using touch operation.

Also, with the one embodiment of the present invention the imaging control section 108, shutter control section 106, aperture control section 104, lens control section 102, exposure control section 112, AF processing section 113, image processing section 111 etc. have been constructed separately from the system control section 116, but some or all of these sections may also be constructed integrally with the system control section 116. It is also possible for these sections to have a hardware structure such as gate circuits that have been generated based on a programming language that is described using Verilog, and also to use a hardware structure that utilizes software such as a DSP (digital signal processor). Suitable combinations of these approaches may also be used.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device that is capable of having a fisheye lens, for changing to circular fish-eye and full-frame fisheye depending on focal length, attached to a main body, and that is capable of shooting digital images, comprising:
    an image sensor on which photometric domains and/or AF region are arranged;
    a lens communication circuit that performs communication with a lens that has been attached and acquires lens information including focal length information; and
    a processor that detects whether or not a lens that has been attached is a circular fisheye lens for changing to circular fish-eye and full-frame fisheye depending on focal length, based on the lens information, and further, responsive to a determination, based on the focal length, that the lens is a circular fisheye lens, restricts the photometric domains and/or AF regions based on an image circle of the circular fisheye lens.

2. The imaging device of claim 1, wherein:
    the processor further restricts to a mode for setting AF regions.

3. The imaging device of claim 1, wherein:
    the processor
    changes, for an image that has been formed by the fisheye lens, at least one projection method among a plurality of projection methods, including either of an orthographic method, an equidistance projection method, an equisolid angle projection method, and solid angle projection method,
    the imaging device further comprises a display that performs live view display of an image that has had projection method changed, and
    the processor restricts to a mode for setting AF regions in the event that the projection method has been changed.

4. The imaging device of claim 3, wherein:
    the processor restricts to a single AF region.

5. An imaging device that is capable of having a fisheye lens, for changing to circular fish-eye and full-frame fisheye depending on focal length, attached to a main body, and that is capable of shooting digital images, comprising:
    an image sensor on which photometric domains and/or AF region are arranged;
    a lens communication circuit that performs communication with a lens that has been attached and acquires lens information including focal length information;
    a processor that detects that a lens that has been attached is a fisheye lens for changing to circular fish-eye and full-frame fisheye depending on focal length, based on the lens information;
    an image processing circuit that corrects an image of an imaging range of the fisheye lens; and
    a display that displays an image after correction by the image processing circuit as a live view image,
    wherein
    the processor, when an image has been corrected by the image processing circuit, performs calculation based on the focal length information so that for the photometric domains and/or AF regions, position or area on the display substantially match position and area on the image sensor.

6. The imaging device of claim 5, wherein:
    the processor restricts the AF regions to 1 if an image has been corrected by the image processing circuit.

7. An imaging device that is capable of having a fisheye lens, for changing to circular fish-eye and full-frame fisheye depending on focal length, attached to a main body, and that is capable of shooting digital images, comprising:
    an image sensor on which photometric domains and/or AF region are arranged;
    a lens communication circuit that performs communication with a lens that has been attached and acquires lens information including focal length information;
    a processor that detects that a lens that has been attached is a fisheye lens for changing to circular fish-eye and full-frame fisheye depending on focal length, based on the lens information;
    an image processing circuit that corrects an image of an imaging range of the fisheye lens; and
    a display that displays an image after correction by the image processing circuit as a live view image,
    wherein
    the processor converts coordinates of AF regions on the live view image to coordinates of AF regions on the image sensor based on the focal length information.

8. The imaging device of claim 5, wherein:
    the image processing circuit performs fisheye/wide-angle conversion and/or projection method conversion.

9. An imaging method, for an imaging device that is capable of having a fisheye lens, for changing to circular fish-eye and full-frame fisheye depending on focal length, attached to a main body, has photometric domains and/or AF regions arranged on an image sensor, and is capable of shooting digital images, comprising:
    performing communication with a lens that has been attached and acquiring lens information including focal length information;
    detecting that a lens that has been attached is a circular fisheye lens for changing to circular fish-eye and full-frame fisheye depending on focal length, based on the lens information; and
    restricting the photometric domains and/or AF regions based on an image circle of the circumferential fisheye lens guided by the focal length, responsive to a determination that the lens is a fisheye lens, for changing to circular fish-eye and full-frame fisheye depending on focal length.

10. The imaging method of claim 9, further comprising:
    further restricting to a mode for setting AF regions.

11. The imaging method of claim 9, further comprising:
    detecting whether or not a lens that has been attached is a fisheye lens based on the lens information;

changing projection method for an image that has been formed by a circular fisheye lens;
performing live view display of an image that has had projection method changed; and
restricting to a mode for setting AF regions in the event that the projection method has been changed.

12. The imaging method of claim 9, further comprising: restricting AF regions to 1.

13. An imaging method, for an imaging device that is capable of having a fisheye lens, for changing to circular fish-eye and full-frame fisheye depending on focal length, attached to a main body, has photometric domains and/or AF regions arranged on an image sensor, and is capable of shooting digital images, comprising:
performing communication with a lens that has been attached and acquiring lens information including focal length information;
correcting an image of imaging range of the fisheye lens, for changing to circular fish-eye and full-frame fisheye depending on focal length;
displaying an image after correction as a live view image; and
when the image has been corrected, performing calculation based on the focal length information so that for the photometric domains and/or AF regions, position or area on the display section substantially match position and area on the image sensor.

14. An imaging method, for an imaging device that is capable of having a fisheye lens, for changing to circular fish-eye and full-frame fisheye depending on focal length, attached to a main body, has photometric domains and/or AF regions arranged on an image sensor, and is capable of shooting digital images, comprising:
performing communication with a lens that has been attached and acquiring lens information including focal length information;
correcting an image of imaging range of the fisheye lens;
displaying an image after correction as a live view image on a display section; and
converting coordinates of AF regions on the live view image to coordinates of the AF regions arranged on the image sensor, based on the focal length, when it has been detected that there is a fisheye lens, for changing to circular fish-eye and full-frame fisheye depending on focal length.

* * * * *